（12） United States Patent
Lee et al.

(10) Patent No.: US 11,856,530 B2
(45) Date of Patent: Dec. 26, 2023

(54) METHOD OF TRANSMITTING POWER HEADROOM REPORT, AND DEVICE THEREFOR

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 17/413,402

(22) PCT Filed: Dec. 10, 2019

(86) PCT No.: PCT/KR2019/017360
§ 371 (c)(1),
(2) Date: Jun. 11, 2021

(87) PCT Pub. No.: WO2020/122544
PCT Pub. Date: Jun. 18, 2020

(65) Prior Publication Data
US 2022/0046556 A1  Feb. 10, 2022

(30) Foreign Application Priority Data
Dec. 13, 2018 (KR) .......................... 10-2018-0161172

(51) Int. Cl.
*H04W 52/36* (2009.01)
(52) U.S. Cl.
CPC ................. *H04W 52/365* (2013.01)
(58) Field of Classification Search
CPC . H04W 52/365; H04W 52/367; H04W 52/58; H04W 52/30; H04W 52/281; H04W 52/18
See application file for complete search history.

(56) References Cited

U.S. PATENT DOCUMENTS

| 9,344,977 | B2* | 5/2016 | Jeong | ................... H04W 52/365 |
| 9,668,229 | B2 | 5/2017 | Yi et al. | |
| 9,723,576 | B2 | 8/2017 | Gao et al. | |
| 2013/0215866 | A1* | 8/2013 | Ahn | .................. H04W 52/365 |
| | | | | 370/329 |
| 2014/0016555 | A1* | 1/2014 | Zhao | ..................... H04W 52/04 |
| | | | | 370/328 |

FOREIGN PATENT DOCUMENTS

| KR | 20120050878 | 5/2012 |
| KR | 20130116273 | 10/2013 |

OTHER PUBLICATIONS

PCT International Search Report & Written Opinion in International Appln. No. PCT/KR2019/017360, dated Mar. 18, 2020, 11 pages.

* cited by examiner

*Primary Examiner* — John J Lee
(74) *Attorney, Agent, or Firm* — Fish & Richardson P.C.

(57) ABSTRACT

In the present disclosure, a UE generates a power headroom report, and transmits the power headroom report to a network. The power headroom report includes a configured transmit power (CTP) field for a serving cell based on a CTP value for the serving cell being not equal to a last reported CTP value for the serving cell. The power headroom report includes no CTP field for the serving cell based on the CTP value for the serving cell being equal to the last reported CTP value for the serving cell. The power headroom report may include first information on whether the CTP field for the serving cell exists after a power headroom filed for the serving cell.

12 Claims, 18 Drawing Sheets

FIG. 4
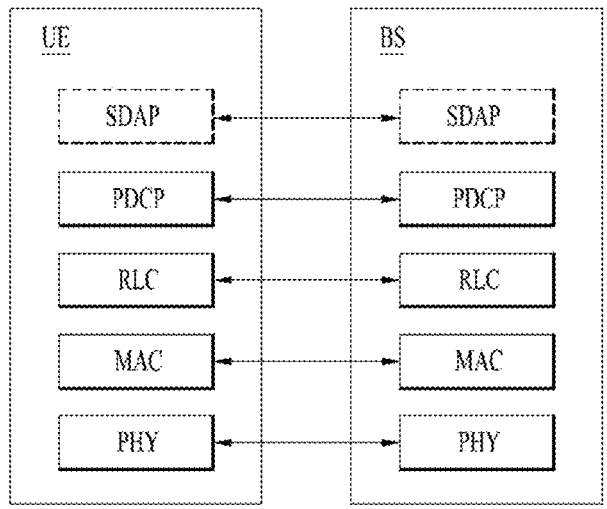
(a) User Plane Protocol Stack
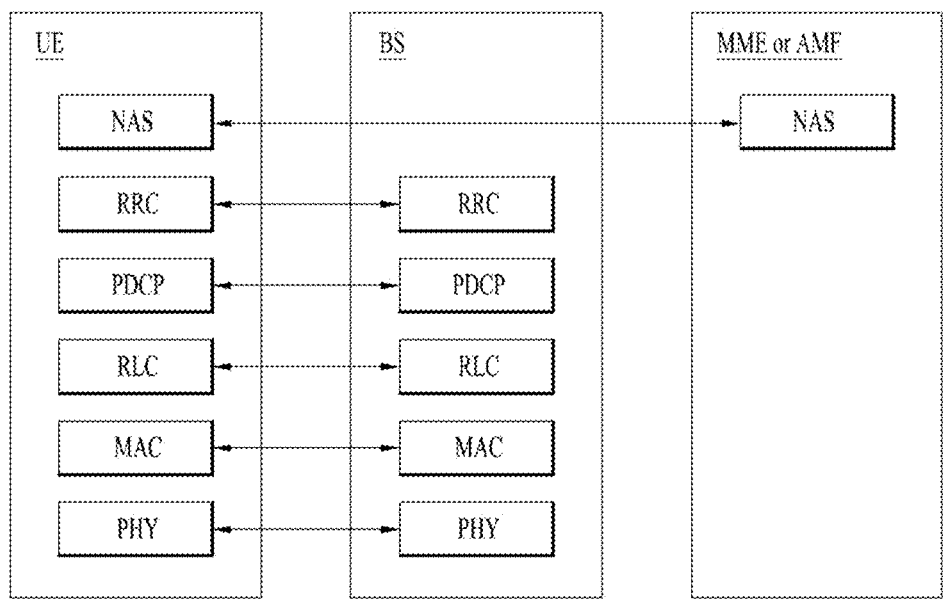
(b) Control Plane Protocol Stack

FIG. 8

| R | R | PH (Type 1, PCell) |
|---|---|---|
| R | R | $P_{CMAX,f,c}$ |

FIG. 9

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) ||||||
| R | R | $P_{CMAX,f,c}$ 1 ||||||
| P | V | PH (Type 1, PCell) ||||||
| R | R | $P_{CMAX,f,c}$ 2 ||||||
| P | V | PH (Type X, Serving Cell 1) ||||||
| R | R | $P_{CMAX,f,c}$ 3 ||||||

...

| P | V | PH (Type X, Serving Cell n) |
|---|---|---|
| R | R | $P_{CMAX,f,c}$ m |

FIG. 15

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| X | V | | | | | | |

| | | |
|---|---|---|
| X | V | PH (Type 2, SpCell of the other MAC entity) |
| R | P | CTP 1 |
| X | V | PH (Type 1, PCell) |
| R | P | CTP 2 |
| X | V | PH (Type X, Serving Cell 1) |
| R | P | CTP 3 |

...

| | | |
|---|---|---|
| X | V | PH (Type X, Serving Cell n) |
| R | P | CTP m |

FIG. 16

| $C_7$ | $C_6$ | $C_5$ | $C_4$ | $C_3$ | $C_2$ | $C_1$ | R |
|---|---|---|---|---|---|---|---|
| X | V | \multicolumn{6}{c|}{PH (Type 2, SpCell of the other MAC entity)} |

| $C_7$ | $C_6$ | | | | | | |
|---|---|---|---|---|---|---|---|
| X | V | PH (Type 2, SpCell of the other MAC entity) | | | | | |
| X | V | PH (Type 1, PCell) | | | | | |
| X | V | PH (Type X, Serving Cell 1) | | | | | |

...

| X | V | PH (Type X, Serving Cell n) |
|---|---|---|

FIG. 17

| $C_7$ | $C_6$ | $C_5$ | $C_4$ | $C_3$ | $C_2$ | $C_1$ | R |
|---|---|---|---|---|---|---|---|

| X | V | PH (Type 2, SpCell of the other MAC entity) |
|---|---|---|
| R | P | CTP 1 |
| X | V | PH (Type 1, PCell) |
| R | P | CTP 2 |
| X | V | PH (Type X, Serving Cell 1) |
| R | P | CTP 3 |

...

| X | V | PH (Type X, Serving Cell n) |
|---|---|---|
| R | P | CTP m |

METHOD OF TRANSMITTING POWER HEADROOM REPORT, AND DEVICE THEREFOR

CROSS-REFERENCE TO RELATED APPLICATIONS

This application is a National Stage application under 35 U.S.C. § 371 of International Application No. PCT/KR2019/017360, filed on Dec. 10, 2019, which claims the benefit of Korean Application No. 10-2018-0161172, filed on Dec. 13, 2018. The disclosures of the prior applications are incorporated by reference in their entirety.

TECHNICAL FIELD

The present invention relates to a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information.

DISCLOSURE OF INVENTION

Technical Problem

Various types of signals, including data signals and control signals, are communicated via the UL and DL. Scheduling of such communications is typically performed, to achieve improved efficiency, latency, and/or reliability. Overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

Solution to Problem

As an aspect of the present disclosure, provided herein is a method for transmitting a power headroom report by a user equipment in a wireless communication system. The method comprises: generating the power headroom report; and transmitting the power headroom report to a network. The power headroom report includes a configured transmit power (CTP) field for a serving cell when a CTP value for the serving cell is not equal to a last reported CTP value for the serving cell, and the power headroom report includes no CTP field for the serving cell when the CTP value for the serving cell is equal to the last reported CTP value for the serving cell. The power headroom report may include first information on whether the CTP field for the serving cell exists after a power headroom filed for the serving cell.

As another aspect of the present disclosure, provide herein is a user equipment (UE) of transmitting a power headroom report in a wireless communication system. The UE comprises: a transceiver; at least one processor; and at least one computer memory operably connectable to the at least one processor and storing instructions that, when executed, cause the at least one processor to perform operations. The operations comprise: generating the power headroom report; and transmitting the power headroom report to a network. The power headroom report includes a configured transmit power (CTP) field for a serving cell when a CTP value for the serving cell is not equal to a last reported CTP value for the serving cell, and the power headroom report includes no CTP field for the serving cell when the CTP value for the serving cell is equal to the last reported CTP value for the serving cell. The power headroom report may include first information on whether the CTP field for the serving cell exists after a power headroom filed for the serving cell.

As a further aspect of the present disclosure, provided herein is a device for a user equipment (UE). The device comprises: at least one processor; and at least one computer memory operably connectable to the at least one processor and storing instructions that, when executed, cause the at least one processor to perform operations. The operations comprise: generating a power headroom report; and transmitting the power headroom report to a network. The power headroom report includes a configured transmit power (CTP) field for a serving cell when a CTP value for the serving cell is not equal to a last reported CTP value for the serving cell, and the power headroom report includes no CTP field for the serving cell when the CTP value for the serving cell is equal to the last reported CTP value for the serving cell. The power headroom report may include first information on whether the CTP field for the serving cell exists after a power headroom filed for the serving cell.

In each aspect of the present disclosure, the power headroom report further may include a power headroom value for the serving cell.

In each aspect of the present disclosure, the power headroom report further may include second information regarding whether the power headroom value for the serving cell in the power headroom report is based on a real uplink transmission or a uplink reference format.

In each aspect of the present disclosure, when the second information is set to a value representing that the power headroom value for the serving cell in the power headroom report is based on a real uplink transmission, the first information may be set to a first value or second value depending on whether the power headroom report includes a CTP field for the serving cell.

In each aspect of the present disclosure, when the second information is set to a value representing that the power headroom value for the serving cell in the power headroom report is based on a uplink reference format, the first information may be set to a first value representing that the power headroom report includes no CTP field for the serving cell.

The above technical solutions are merely some parts of the implementations of the present disclosure and various implementations into which the technical features of the present disclosure are incorporated can be derived and understood by persons skilled in the art from the following detailed description of the present disclosure.

Advantageous Effects of Invention

In some scenarios, implementations of the present disclosure may provide one or more of the following advantages.

In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention:

FIG. 4 illustrates an example of protocol stacks in a third generation partnership project (3GPP) based wireless communication system;

FIG. 8 to FIG. 10 illustrate examples of medium access control (MAC) control elements (CEs) for power headroom reporting according to some implementations of the present disclosure;

FIG. 12 to FIG. 17 illustrate examples of PHR MAC CE according to some implementations of the present disclosure;

MODE FOR THE INVENTION

Figure 1:
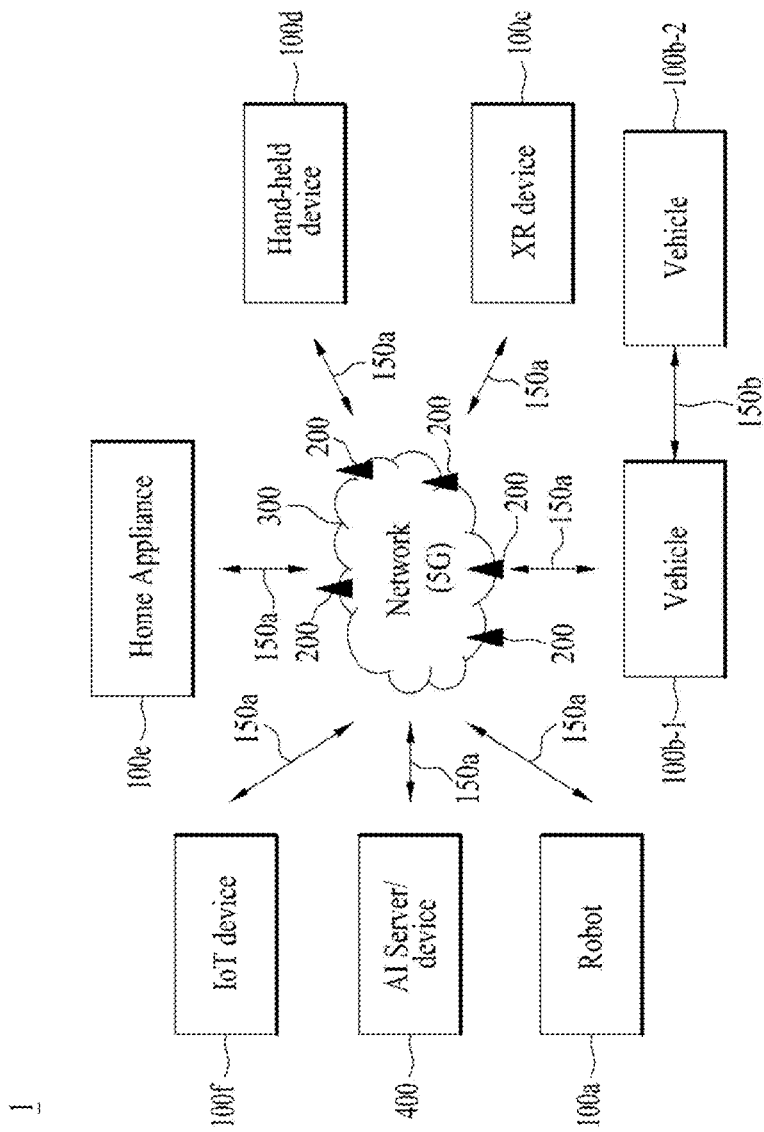
FIG. 1 illustrates an example of a communication system 1 to which implementations of the present disclosure is applied.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE

3GPP TS 36.211: Physical channels and modulation

3GPP TS 36.212: Multiplexing and channel coding

3GPP TS 36.213: Physical layer procedures

3GPP TS 36.214: Physical layer; Measurements

3GPP TS 36.300: Overall description

3GPP TS 36.304: User Equipment (UE) procedures in idle mode
3GPP TS 36.314: Layer 2-Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). In the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the enhanced packet core (EPC)/long term evolution (LTE) system is referred to as an eNB, and a BS of the new radio (NR) system is referred to as a gNB.

In the present disclosure, a node refers to a point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In the present disclosure, a physical downlink control channel (PDCCH), and a physical downlink shared channel (PDSCH) refer to a set of time-frequency resources or resource elements (REs) carrying downlink control information (DCI), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection reestablishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. In the present disclosure, for dual connectivity (DC) operation, the term "special Cell" refers to the PCell of the master cell group (MCG) or the PSCell of the secondary cell group (SCG), and otherwise the term Special Cell refers to the PCell. An SpCell supports physical uplink control channel (PUCCH) transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with DC. For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells.

The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In DC, two MAC entities are configured in the UE: one for the MCG and one for the SCG. Each MAC entity is configured by RRC with a serving cell supporting PUCCH transmission and contention based Random Access. In the present disclosure, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, monitoring a channel refers to attempting to decode the channel. For example, monitoring a physical downlink control channel (PDCCH) refers to attempting to decode PDCCH(s) (or PDCCH candidates).

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200a may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
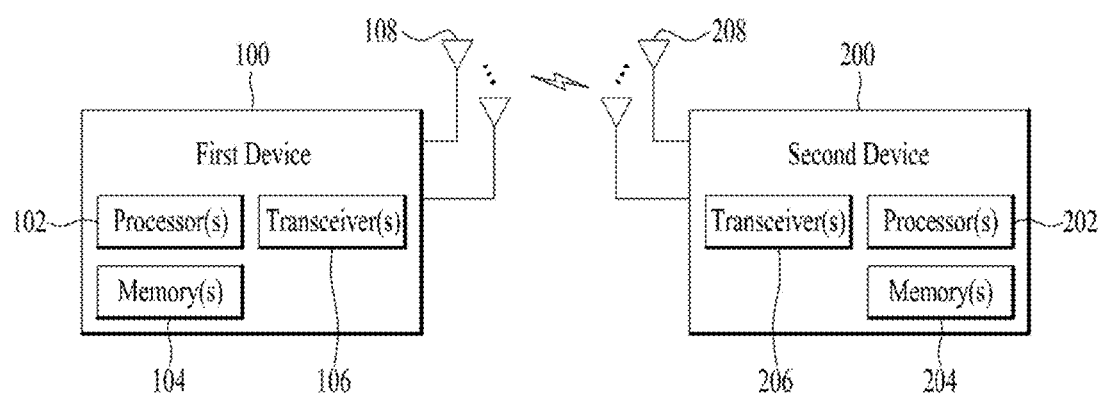
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In some implementations of the present disclosure, a UE may operate as a transmitting device in uplink (UL) and as a receiving device in downlink (DL). In some implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS, unless otherwise mentioned or described. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

Figure 3:
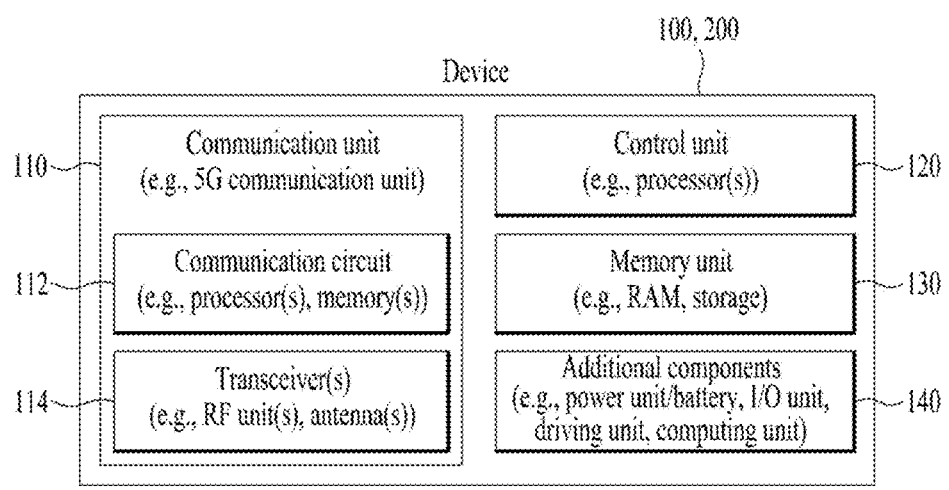
FIG. 3 illustrates another example of a wireless device which can perform implementations of the present invention.

FIG. 3 illustrates another example of a wireless device which can perform implementations of the present invention. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

FIG. 4 illustrates an example of protocol stacks in a 3GPP based wireless communication system.

In particular, FIG. 4(a) illustrates an example of a radio interface user plane protocol stack between a UE and a base station (BS) and FIG. 4(b) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(a), the user plane protocol stack may be divided into a first layer (Layer 1) (i.e., a physical (PHY) layer) and a second layer (Layer 2). Referring to FIG. 4(b), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

The NAS control protocol is terminated in an access management function (AMF) on the network side, and performs functions such as authentication, mobility management, security control and etc.

In the 3GPP LTE system, the layer 2 is split into the following sublayers: medium access control (MAC), radio link control (RLC), and packet data convergence protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network quality of service (QoS) flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G core (5GC) or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
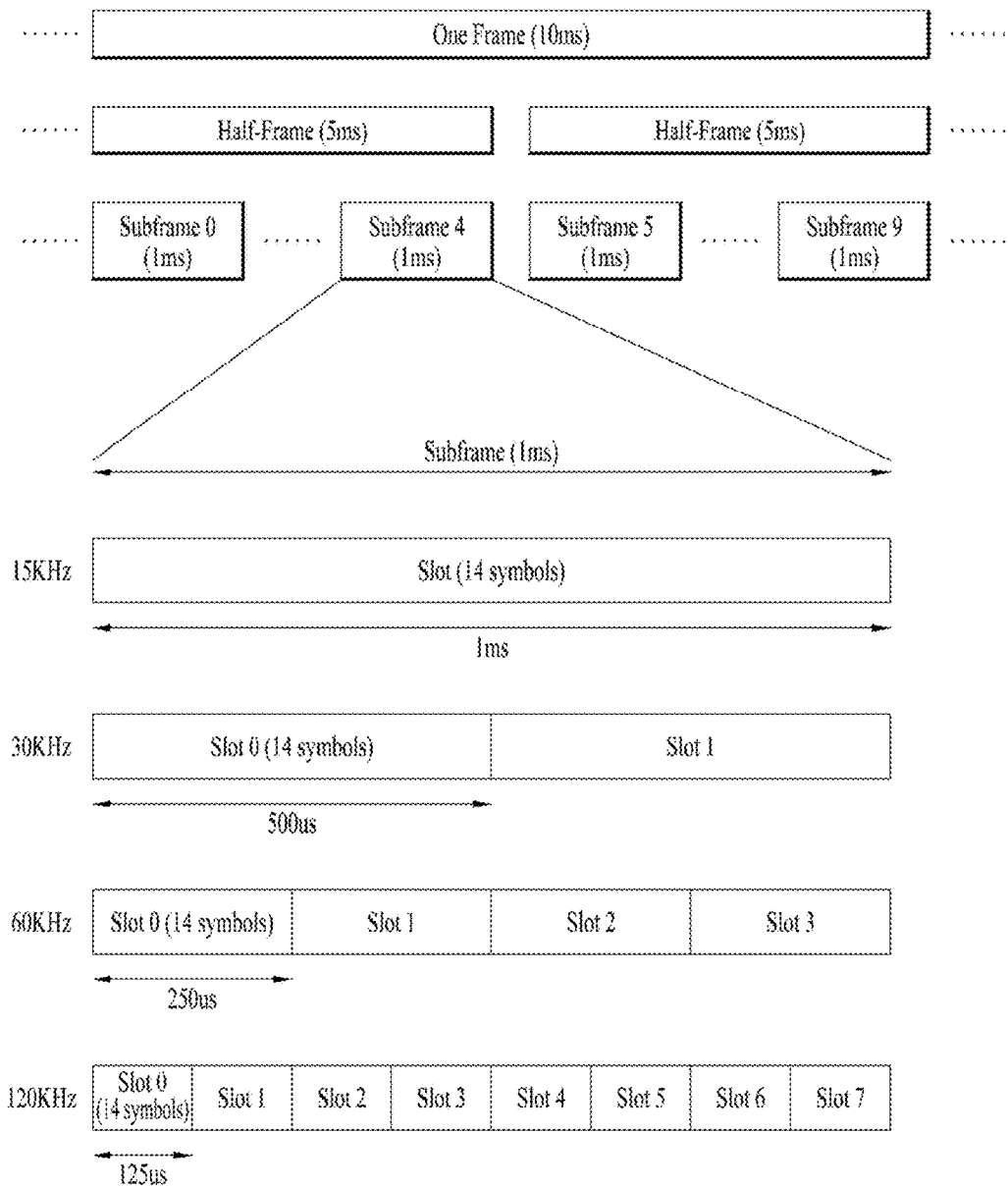
FIG. 5 illustrates an example of a frame structure in a 3GPP based wireless communication system.

FIG. 5 illustrates an example of a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz. The following table shows the number of OFDM symbols per slot, the number of slots per frame, and the number of slots per for the normal CP, according to the subcarrier spacing $\Delta f = 2u * 15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks in the resource grid and the subscript x is DL for downlink and UL for uplink. $N^{RB}_{sc}$ is the number of subcarriers per resource blocks. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, a resource block is defined by 12 consecutive subcarriers in the frequency domain.

In the 3GPP NR system, resource blocks are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block n $P_{RB}$ in the bandwidth part i and the common resource block $n_{CRB}$ is as follows: n $P_{RB}=n_{CRB} N^{size}_{BWP,i}$, where $N^{size}_{BWP,i}$ is the common resource block where bandwidth part starts relative to CRB 0. The BWP includes a plurality of consecutive resource blocks. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

NR frequency bands are defined as 2 types of frequency range, FR1 and FR2. FR2 is may also called millimeter wave (mmW). The frequency ranges in which NR can operate are identified as described in Table 3.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The following table shows NR operating bands in FR1.

TABLE 4

| NR operating band | Uplink (UL) operating band BS receive/ UE transmit $F_{UL\_low}$-$F_{UL\_high}$ | Downlink (DL) operating band BS transmit/ UE receive $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD[1] |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

NOTE 1:
UE that complies with the NR Band n50 minimum requirements in this specification shall also comply with the NR Band n51 minimum requirements.
NOTE 2:
UE that complies with the NR Band n75 minimum requirements in this specification shall also comply with the NR Band n76 minimum requirements.

Figure 6:
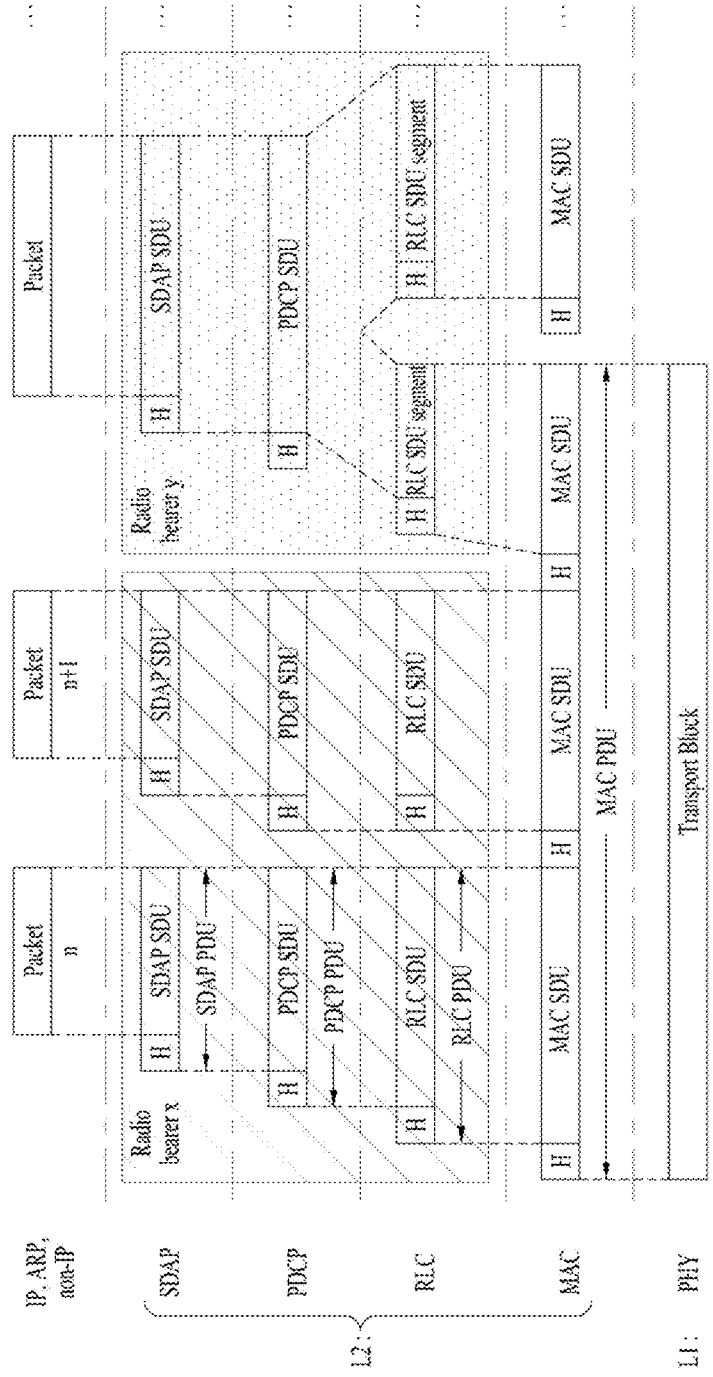
FIG. 6 illustrates a data flow example in the 3GPP new radio (NR) system.

FIG. 6 illustrates a data flow example in the 3GPP NR system.

In FIG. 6, "RB" denotes a radio bearer, and "H" denotes a header. Radio bearers are categorized into two groups: data radio bearers (DRB) for user plane data and signaling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to physical uplink shared channel (PUSCH) and physical random access channel (PRACH), respectively, and the downlink transport channels DL-SCH, BCH and PCH are mapped to physical downlink shared channel (PDSCH), physical broad cast channel (PBCH) and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

For UCI transmission/reception, the following PUCCH formats may be used.

TABLE 5

| PUCCH format | Length in OFDM symbols | Number of UCI bits |
|---|---|---|
| 0 | 1-2 | =<2 |
| 1 | 4-14 | =<2 |
| 2 | 1-2 | >2 |
| 3 | 4-14 | >2 |
| 4 | 4-14 | >2 |

PUCCH format 0 is a short PUCCH of 1 or 2 symbols with small UCI payloads of up to two bits. PUCCH format 1 is a long PUCCH of 4 to 14 symbols with small UCI payloads of up to 2 bits. PUCCH format 2 is a short PUCCH of 1 or 2 symbols with large UCI payloads of more than two bits with no UE multiplexing capability in the same PRBs. PUCCH format 3 is a long PUCCH of 4 to 14 symbols with large UCI payloads with no UE multiplexing capability in the same PRBs. PUCCH format 4 is a long PUCCH of 4 to 14 symbols with moderate UCI payloads with multiplexing capacity of up to 4 UEs in the same PRBs. For each PUCCH format, resource location is configured by RRC signalling. For example, IE PUCCH-Config is used to configure UE specific PUCCH parameters (per BWP). In order to transmit data unit(s) of the present disclosure on UL-SCH, a UE shall have uplink resources available to the UE.

In order to receive data unit(s) of the present disclosure on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a Random Access Response, or configured to the UE semi-persistently by RRC. Downlink assignment is either received by the UE dynamically on the PDCCH, or configured to the UE semi-persistently by RRC signaling from the BS.

In UL, the BS can dynamically allocate resources to UEs via the Cell Radio Network Temporary Identifier (C-RNTI) on PDCCH(s). A UE always monitors the PDCCH(s) in order to find possible grants for uplink transmission when its downlink reception is enabled (activity governed by discontinuous reception (DRX) when configured). In addition, with Configured Grants, the BS can allocate uplink resources for the initial HARQ transmissions to UEs. Two types of configured uplink grants are defined: Type 1 and Type 2. With Type 1, RRC directly provides the configured uplink grant (including the periodicity). With Type 2, RRC defines the periodicity of the configured uplink grant while PDCCH addressed to Configured Scheduling RNTI (CS-RNTI) can either signal and activate the configured uplink grant, or deactivate it; i.e. a PDCCH addressed to CS-RNTI indicates that the uplink grant can be implicitly reused according to the periodicity defined by RRC, until deactivated.

In DL, the BS can dynamically allocate resources to UEs via the C-RNTI on PDCCH(s). A UE always monitors the PDCCH(s) in order to find possible assignments when its downlink reception is enabled (activity governed by DRX when configured). In addition, with Semi-Persistent Scheduling (SPS), the BS can allocate downlink resources for the initial HARQ transmissions to UEs: RRC defines the periodicity of the configured downlink assignments while PDCCH addressed to CS-RNTI can either signal and activate the configured downlink assignment, or deactivate it. In other words, a PDCCH addressed to CS-RNTI indicates that the downlink assignment can be implicitly reused according to the periodicity defined by RRC, until deactivated.

Resource Allocation by PDCCH (i.e. Resource Allocation by DCI)

PDCCH can be used to schedule DL transmissions on PDSCH and UL transmissions on PUSCH, where the downlink control information (DCI) on PDCCH includes: downlink assignments containing at least modulation and coding format (e.g., modulation and coding scheme (MCS) index $I_{MCS}$), resource allocation, and hybrid-ARQ information related to DL-SCH; or uplink scheduling grants containing at least modulation and coding format, resource allocation, and hybrid-ARQ information related to UL-SCH. The size and usage of the DCI carried by one PDCCH are varied depending on DCI formats. For example, in the 3GPP NR system, DCI format 0_0 or DCI format 0_1 is used for scheduling of PUSCH in one cell, and DCI format 1_0 or DCI format 1_1 is used for scheduling of PDSCH in one cell.

Figure 7:
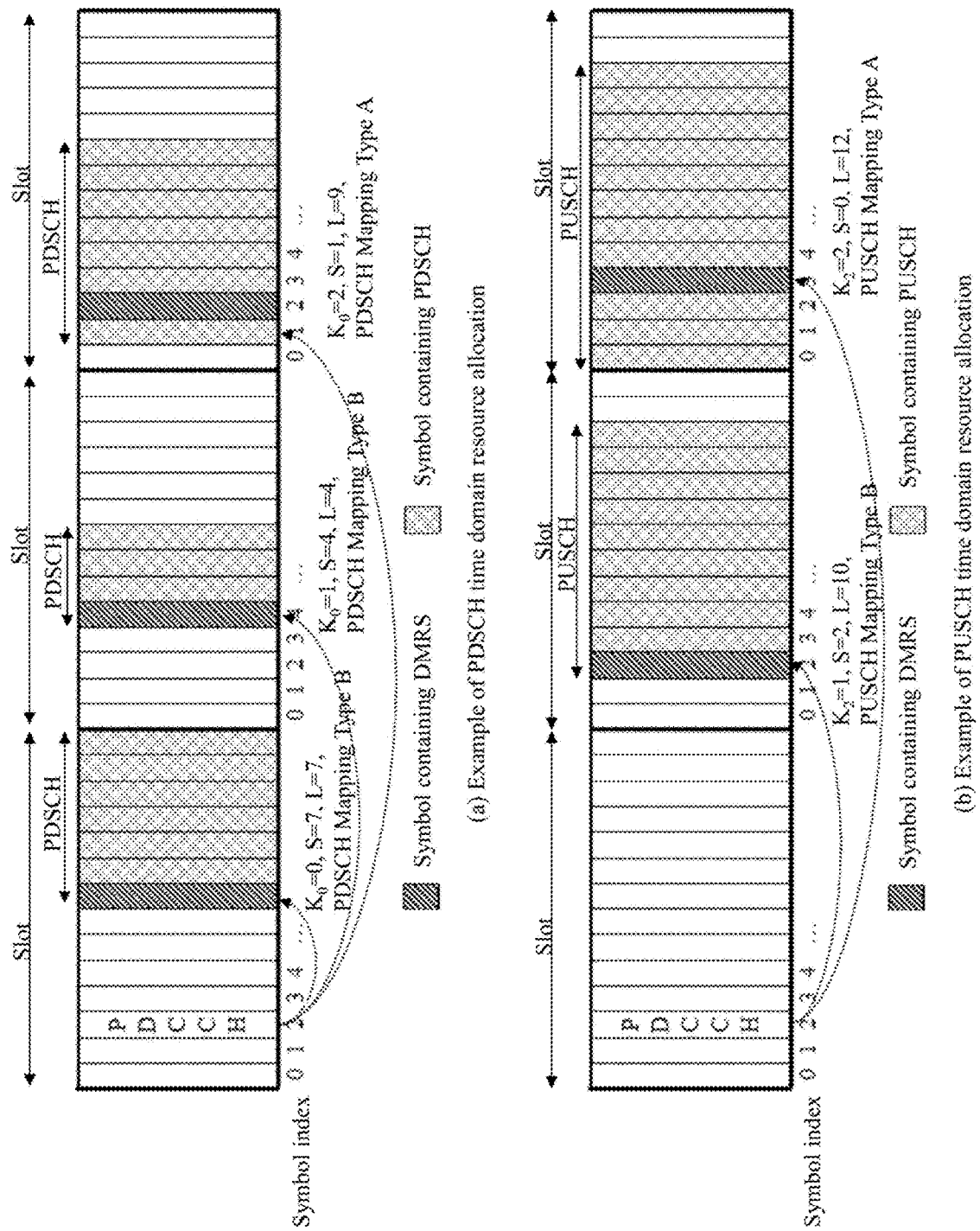
FIG. 7 illustrates an example of physical downlink shared channel (PDSCH) time domain resource allocation by physical downlink control channel (PDCCH), and an example of physical uplink shared channel (PUSCH) time resource allocation by PDCCH.

FIG. 7 illustrates an example of PDSCH time domain resource allocation by PDCCH, and an example of PUSCH time resource allocation by PDCCH.

Downlink control information (DCI) carried by a PDCCH for scheduling PDSCH or PUSCH includes a value m for a row index m+1 to an allocation table for PDSCH or PUSCH. Either a predefined default PDSCH time domain allocation A, B or C is applied as the allocation table for PDSCH, or RRC configured pdsch-TimeDomainAllocationList is applied as the allocation table for PDSCH. Either a predefined default PUSCH time domain allocation A is applied as the allocation table for PUSCH, or the RRC configured pusch-TimeDomainAllocationList is applied as the allocation table for PUSCH. Which PDSCH time domain resource allocation configuration to apply and which PUSCH time domain resource allocation table to apply are determined according to a fixed/predefined rule (e.g. Table 5.1.2.1.1-1 in 3GPP TS 38.214 v15.3.0, Table 6.1.2.1.1-1 in 3GPP TS 38.214 v15.3.0).

Each indexed row in PDSCH time domain allocation configurations defines the slot offset $K_0$, the start and length indicator SLIV, or directly the start symbol S and the allocation length L, and the PDSCH mapping type to be assumed in the PDSCH reception. Each indexed row in PUSCH time domain allocation configurations defines the slot offset $K_2$, the start and length indicator SLIV, or directly the start symbol S and the allocation length L, and the PUSCH mapping type to be assumed in the PUSCH reception. $K_0$ for PDSCH, or $K_2$ for PUSCH is the timing difference between a slot with a PDCCH and a slot with PDSCH or PUSCH corresponding to the PDCCH. SLIV is a joint indication of starting symbol S relative to the start of the slot with PDSCH or PUSCH, and the number L of consecutive symbols counting from the symbol S. For PDSCH/PUSCH mapping type, there are two mapping types: one is Mapping Type A where demodulation reference signal (DMRS) is positioned in $3^{rd}$ or $4^{th}$ symbol of a slot depending on the RRC signaling, and other one is Mapping Type B where DMRS is positioned in the first allocated symbol.

The scheduling DCI includes the Frequency domain resource assignment field which provides assignment information on resource blocks used for PDSCH or PUSCH. For example, the Frequency domain resource assignment field may provide a UE with information on a cell for PDSCH or PUSCH transmission, information on a bandwidth part for PDSCH or PUSCH transmission, information on resource blocks for PDSCH or PUSCH transmission.

Resource Allocation by RRC

As mentioned above, in uplink, there are two types of transmission without dynamic grant: configured grant Type 1 where an uplink grant is provided by RRC, and stored as configured grant; and configured grant Type 2 where an uplink grant is provided by PDCCH, and stored or cleared as configured uplink grant based on L1 signaling indicating configured uplink grant activation or deactivation. Type 1 and Type 2 are configured by RRC per serving cell and per BWP. Multiple configurations can be active simultaneously only on different serving cells. For Type 2, activation and deactivation are independent among the serving cells. For the same serving cell, the MAC entity is configured with either Type 1 or Type 2.

A UE is provided with at least the following parameters via RRC signaling from a BS when the configured grant type 1 is configured:

cs-RNTI which is CS-RNTI for retransmission;
periodicity which provides periodicity of the configured grant Type 1;
timeDomainOffset which represents offset of a resource with respect to SFN=0 in time domain;
timeDomainAllocation value m which provides a row index m+1 pointing to an allocation table, indicating a combination of a start symbol S and length L and PUSCH mapping type;
frequencyDomainAllocation which provides frequency domain resource allocation; and
mcsAndTBS which provides $I_{MCS}$ representing the modulation order, target code rate and transport block size. Upon configuration of a configured grant Type 1 for a serving cell by RRC, the UE stores the uplink grant provided by RRC as a configured uplink grant for the indicated serving cell, and initialise or re-initialise the configured uplink grant to start in the symbol according to timeDomainOffset and S (derived from SLIV), and to reoccur with periodicity. After an uplink grant is configured for a configured grant Type 1, the UE considers that the uplink grant recurs associated with each symbol for which: [(SFN numberOfSlotsPerFrame (numberOfSymbolsPerSlot)+(slot number in the frame*numberOfSymbolsPerSlot)+symbol number in the slot]=(timeDomainOffset numberOfSymbolsPerSlot+S+N periodicity) modulo (1024*numberOfSlotsPerFrame numberOfSymbolsPerSlot), for all N>=0.

A UE is provided with at least the following parameters via RRC signaling from a BS when the configured gran Type 2 is configured:

cs-RNTI which is CS-RNTI for activation, deactivation, and retransmission; and
periodicity which provides periodicity of the configured grant Type 2. The actual uplink grant is provided to the UE by the PDCCH (addressed to CS-RNTI). After an uplink grant is configured for a configured grant Type 2, the UE considers that the uplink grant recurs associated with each symbol for which: [(SFN numberOfSlotsPerFrame numberOfSymbolsPerSlot)+(slot number in the frame*numberOfSymbolsPerSlot)+symbol number in the slot]=[(SFN$_{start\ time}$ number OfSlotsPerFrame*numberOfSymbolsPerSlot+slot$_{start\ time}$*numberOfSymbolsPerSlot+symbol$_{start\ time}$) N periodicity] modulo (1024*numberOfSlotsPerFrame*numberOfSymbolsPerSlot), for all N>=0, where SFN$_{start\ time}$, slot$_{start\ time}$, and symbol$_{start\ time}$ are the SFN, slot, and symbol, respectively, of the first transmission opportunity of PUSCH where the configured uplink grant was (re-)initialised. numberOfSlotsPerFrame and numberOfSymbolsPerSlot refer to the number of consecutive slots per frame and the number of consecutive OFDM symbols per slot, respectively (see Table 1 and Table 2).

For configured uplink grants, the HARQ Process ID associated with the first symbol of a UL transmission is derived from the following equation:

HARQ Process ID=[floor(CURRENT_symbol/periodicity)] modulo nrofHARQ-Processes where CURRENT_symbol=(SFN numberOfSlotsPerFrame numberOfSymbolsPerSlot+slot number in the frame*numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211. CURRENT_symbol refers to the symbol index of the first transmission occasion of a repetition bundle that takes place. A HARQ process is configured for a configured uplink grant if the configured uplink grant is activated and the associated HARQ process ID is less than nrofHARQ-Processes.

For downlink, a UE may be configured with semi-persistent scheduling (SPS) per serving cell and per BWP by RRC signaling from a BS. Multiple configurations can be active simultaneously only on different serving cells. Activation and deactivation of the DL SPS are independent among the serving cells. For DL SPS, a DL assignment is provided to the UE by PDCCH, and stored or cleared based on L1 signaling indicating SPS activation or deactivation. A UE is provided with the following parameters via RRC signaling from a BS when SPS is configured:

cs-RNTI which is CS-RNTI for activation, deactivation, and retransmission;
nrofHARQ-Processes: which provides the number of configured HARQ processes for SPS;
periodicity which provides periodicity of configured downlink assignment for SPS. When SPS is released by upper layers, all the corresponding configurations shall be released.

After a downlink assignment is configured for SPS, the UE considers sequentially that the N$^{th}$ downlink assignment occurs in the slot for which: (numberOfSlotsPerFrame SFN+slot number in the frame)=[(numberOfSlotsPerFrame SFN start time+slot$_{start\ time}$)+N*periodicity*numberOfSlotsPerFrame/10] modulo (1024*numberOfSlotsPerFrame), where SFN$_{start\ time}$ and slot$_{start\ time}$ are the SFN and slot, respectively, of the first transmission of PDSCH where the configured downlink assignment was (re-)initialised.

For configured downlink assignments, the HARQ Process ID associated with the slot where the DL transmission starts is derived from the following equation:

HARQ Process ID=[floor (CURRENT_slot*10/(numberOfSlotsPerFrame periodicity))] modulo nrofHARQ-Processes where CURRENT_slot=[(SFN*numberOfSlotsPerFrame)+slot number in the frame] and numberOfSlotsPerFrame refers to the number of consecutive slots per frame as specified in TS 38.211.

A UE validates, for scheduling activation or scheduling release, a DL SPS assignment PDCCH or configured UL grant type 2 PDCCH if the cyclic redundancy check (CRC) of a corresponding DCI format is scrambled with CS-RNTI provided by the RRC parameter cs-RNTI and the new data indicator field for the enabled transport block is set to 0. Validation of the DCI format is achieved if all fields for the DCI format are set according to Table 6 or Table 7. Table 6 shows special fields for DL SPS and UL grant Type 2 scheduling activation PDCCH validation, and Table 7 shows special fields for DL SPS and UL grant Type 2 scheduling release PDCCH validation.

TABLE 6

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and actual UL grant, and the corresponding modulation and coding scheme are provided by the resource assignment fields (e.g. time domain resource assignment field which provides Time domain resource assignment value m, frequency domain resource assignment field which provides the frequency resource block allocation, modulation and coding scheme field) in the DCI format carried by the DL SPS and UL grant Type 2 scheduling activation PDCCH. If validation is achieved, the UE considers the information in the DCI format as valid activation or valid release of DL SPS or configured UL grant Type 2. The following table shows examples of UE Power Classes.

The following UE Power Classes define the maximum output power for any transmission bandwidth within the channel bandwidth of NR carrier unless otherwise stated. The period of measurement shall be at least one subframe (1 ms).

TABLE 8

| NR band | Class 1 (dBm) | Tolerance (dB) | Class 2 (dBm) | Tolerance (dB) | Class 3 (dBm) | Tolerance (dB) |
|---|---|---|---|---|---|---|
| n1 | | | | | 23 | ±2 |
| n2 | | | | | 23 | ±2[3] |
| n3 | | | | | 23 | ±2[3] |
| n5 | | | | | 23 | ±2 |
| n7 | | | | | 23 | ±2[3] |
| n8 | | | | | 23 | ±2[3] |
| n12 | | | | | 23 | ±2[3] |
| n20 | | | | | 23 | ±2[3] |
| n25 | | | | | 23 | ±2 |
| n28 | | | | | 23 | +2/−2.5 |
| n34 | | | | | 23 | ±2 |
| n38 | | | | | 23 | ±2 |
| n39 | | | | | 23 | ±2 |
| n40 | | | | | 23 | ±2 |
| n41 | | | 26 | +2/−3[3] | 23 | ±2[3] |
| n50 | | | | | 23 | ±2 |
| n51 | | | | | 23 | ±2 |
| n66 | | | | | 23 | ±2 |
| n70 | | | | | 23 | ±2 |
| n71 | | | | | 23 | +2/−2.5 |
| n74 | | | | | 23 | ±2 |
| n77 | | | 26 | +2/−3 | 23 | +2/−3 |
| n78 | | | 26 | +2/−3 | 23 | +2/−3 |
| n79 | | | 26 | +2/−3 | 23 | +2/−3 |
| n80 | | | | | 23 | ±2 |
| n81 | | | | | 23 | ±2 |
| n82 | | | | | 23 | ±2 |
| n83 | | | | | 23 | +2/−2.5 |
| n84 | | | | | 23 | ±2 |
| n86 | | | | | 23 | ±2 |

NOTE 1:
$P_{PowerClass}$ is the maximum UE power specified without taking into account the tolerance.
NOTE 2:
Power class 3 is default power class unless otherwise stated.
NOTE 3:
Refers to the transmission bandwidths confined within $F_{UL\_low}$ and $F_{UL\_low}$ + 4 MHz or $F_{UL\_high}$ − 4 MHz and $F_{UL\_high}$, the maximum output power requirement is relaxed by reducing the lower tolerance limit by 1.5 dB.

The UE is allowed to set its configured maximum output power $P_{CMAX,f,c}$ for carrier f of serving cell c in each slot. The configured maximum output power $P_{CMAX,f,c}$ is set within the following bounds:

$P_{CMAX\_L,f,c} \leq P_{CMAX,f,c} \leq P_{CMAX\_H,f,c}$ with i) $P_{CMAX\_L,f,c} =$ MIN$\{P_{EMAX,c} - T_{C,c}$, $(P_{PowerClass} - \Delta P_{PowerClass}) -$ MAX$(MPR_c + A\text{-}MPR_c + \Delta T_{IB,c} + \Delta T_{C,c} + \Delta T_{RxSRS}, P\text{-}MPR_c)\}$ and ii) $P_{CMAX\_H,f,c} =$ MIN$\{P_{EMAX,c}, P_{PowerClass} - \Delta P_{PowerClass}\}$, where $P_{EMAX,c}$ is the value given by RRC parameter P-Max for serving cell c, $P_{PowerClass}$ is the maximum UE power specified in Table 8.

When the RRC parameter powerBoostPi2BPSK is set to 1, $P_{EMAX,c}$ is increased by +3 dB for a power class 3 capable UE operating in TDD bands n40, n77, n78, and n79 with PI/2 BPSK modulation and 40% or less slots in radio frame are used for UL transmission when $P_{EMAX,c} \geq 20$ dBm. When the RRC parameter powerBoostPi2BPSK is set to 1, $\Delta P_{PowerClass} = -3$ dB for a power class 3 capable UE operating in TDD bands n40, n77, n78, and n79 with PI/2 BPSK modulation and 40% or less slots in radio frame are used for UL transmission. $\Delta P_{PowerClass} = 3$ dB for a power class 2 capable UE operating in Band n41, n77, n78 and n79, when P-max of 23 dBm or lower is indicated; or when the field of UE capability maxUplinkDutyCycle is absent and the percentage of uplink symbols transmitted in a certain evaluation period is larger than 50%; or when the field of UE capability maxUplinkDutyCycle is not absent and the percentage of uplink symbols transmitted in a certain evaluation period is larger than maxUplinkDutyCycle as defined in 3GPP TS 38.331 (the exact evaluation period is no less than one radio frame); or if P-Max is not indicated in the cell, otherwise $\Delta P_{PowerClass} = 0$ dB. $\Delta T_{IB,c}$ is the additional tolerance for serving cell c as specified in TS 38.101-3, $\Delta T_{IB,c} = 0$ dB otherwise. $\Delta T_{C,c} = 1.5$ dB when NOTE 3 in Table 8 applies for a serving cell c, otherwise $\Delta T_{C,c} = 0$ dB.

Allowed Maximum Power Reduction (MPR$_c$) for serving cell c and Additional MPR (A-MPR$_c$) for serving cell c are specified in 3GPP 38.101-1, 3GPP 38.101-2 or 38.101-3.

$\Delta T_{RxSRS}$ is 3 dB and is applied when UE transmits SRS to the antenna port that is designated as Rx port. For other SRS transmissions, $\Delta T_{RxSRS}$ is zero.

P-MPR$_c$ is the allowed maximum output power reduction for:

a) ensuring compliance with applicable electromagnetic energy absorption requirements and addressing unwanted emissions/self desense requirements in case of simultaneous transmissions on multiple RAT(s) for scenarios not in scope of 3GPP RAN specifications;

b) ensuring compliance with applicable electromagnetic energy absorption requirements in case of proximity detection is used to address such requirements that require a lower maximum output power.

The UE shall apply P-MPR$_c$ for serving cell c only for the above cases. For UE conducted conformance testing P-MPR$_c$ shall be 0 dB.

The measured configured maximum output power P$_{UMAX,f,c}$ shall be within the following bounds:

$$P_{CMAX\_L,f,c} - \text{MAX}\{T_{L,c}, T(P_{CMAX\_L,f,c})\} \leq P_{UMAX,f,c} \leq P_{CMAX\_H,f,c} + T(P_{CMAX\_H,f,c}),$$

where the tolerance T(P$_{CMAX,f,c}$) for applicable values of P$_{CMAX,f,c}$ is specified in Table 9. The tolerance T$_{L,c}$ is the absolute value of the lower tolerance for the applicable operating band as specified in Table 8.

TABLE 9

| P$_{CMAX, f, c}$ (dBm) | Tolerance T(P$_{CMAX, f, c}$) (dB) |
| --- | --- |
| 23 < P$_{CMAX, c}$ ≤ 33 | 2.0 |
| 21 ≤ P$_{CMAX, c}$ ≤ 23 | 2.0 |
| 20 ≤ P$_{CMAX, c}$ < 21 | 2.5 |
| 19 ≤ P$_{CMAX, c}$ < 20 | 3.5 |
| 18 ≤ P$_{CMAX, c}$ < 19 | 4.0 |
| 13 ≤ P$_{CMAX, c}$ < 18 | 5.0 |
| 8 ≤ P$_{CMAX, c}$ < 13 | 6.0 |
| −40 ≤ P$_{CMAX, c}$ < 8 | 7.0 |

In order to utilize radio resource efficiently, MAC in a BS includes a dynamic resource schedulers that allocate physical layer resources for the downlink and the uplink. A UE measures data that is buffered in the logical channel queues in the UE and transmits a uplink buffer status report on the data to the BS to provide support for QoS-awake packet scheduling at the BS. A UE measures the difference between the nominal UE maximum transmit power and the estimated power for uplink transmission and transmits a power headroom report on the difference to provide support for power aware packet scheduling at the BS. In particular, the Power Headroom reporting procedure may be used to provide the serving BS with the following information:

Type 1 power headroom: the difference between the nominal UE maximum transmit power and the estimated power for UL-SCH transmission per activated Serving Cell;

Type 2 power headroom: the difference between the nominal UE maximum transmit power and the estimated power for UL-SCH and PUCCH transmission on SpCell of the other MAC entity (i.e. E-UTRA MAC entity in E-UTRAN New Radio Dual Connectivity (EN-DC) case only);

Type 3 power headroom: the difference between the nominal UE maximum transmit power and the estimated power for SRS transmission per activated Serving Cell.

A BS may control Power Headroom reporting at a UE by configuring the following parameters to the UE via RRC signaling:

phr-PeriodicTimer;
phr-ProhibitTimer;
phr-Tx-PowerFactorChange;
phr-Type2OtherCell;
phr-ModeOtherCG;
multiplePHR.

The types of UE power headroom reports are the following. A Type 1 UE power headroom PH that is valid for PUSCH transmission occasion i on active UL BWP b of carrier f of serving cell c. A Type 3 UE power headroom PH that is valid for SRS transmission occasion i on active UL BWP b of carrier f of serving cell c. A UE may determine whether a power headroom report for an activated serving cell is based on an actual transmission or a reference format based on the downlink control information the UE received until and including the PDCCH monitoring occasion where the UE detects the first DCI format scheduling an initial transmission of a transport block since a power headroom report was triggered.

A Power Headroom Report (PHR) may be triggered if any of the following events occur:

phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission, where the path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between;

phr-PeriodicTimer expires;

upon configuration or reconfiguration of the power headroom reporting functionality by upper layers, which is not used to disable the function;

activation of an SCell of any MAC entity with configured uplink;

addition of the PSCell (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPR$_c$ as specified in 3GPP TS 38.101) for this cell has changed more than phr-Tx-PowerFactorChange dB since the last transmission of a PHR when the MAC entity had UL resources allocated for transmission or PUCCH transmission on this cell.

If the MAC entity of the UE has UL resources allocated for a new transmission the MAC entity of the UE shall:

1> if it is the first UL resource allocated for a new transmission since the last MAC reset:

2>> start phr-PeriodicTimer;

1> if the Power Headroom reporting procedure determines that at least one PHR has been triggered and not cancelled; and 1> if the allocated UL resources can accommodate the MAC CE for PHR which the MAC entity is configured to transmit, plus its subheader, as a result of logical channel priority procedure:

2>> if multiplePHR is configured:

3>>> for each activated Serving Cell with configured uplink associated with any MAC entity:

4>>>> obtain the value of the Type 1 or Type 3 power headroom for the corresponding uplink carrier;

4>>>> if this MAC entity has UL resources allocated for transmission on this Serving Cell; or 4>>>> if the other MAC entity, if configured, has UL resources allocated for transmission on this Serving Cell and phr-ModeOtherCG is set to real by upper layers:

5>>>>> obtain the value for the corresponding P$_{CMAX,f,c}$ field from the physical layer.

3>>> if phr-Type2OtherCell is configured:
4>>>> if the other MAC entity is E-UTRA MAC entity:
5>>>>> obtain the value of the Type 2 power headroom for the SpCell of the other MAC entity (i.e. E-UTRA MAC entity);
5>>>>> if phr-ModeOtherCG is set to real by upper layers:
6>>>>>> obtain the value for the corresponding $P_{CMAX,f,c}$ field for the SpCell of the other MAC entity (i.e. E-UTRA MAC entity) from the physical layer.
3>>> instruct the Multiplexing and Assembly procedure to generate and transmit the Multiple Entry PHR MAC CE based on the values reported by the physical layer.
2>> else (i.e. Single Entry PHR format is used):
3>>> obtain the value of the Type 1 power headroom from the physical layer for the corresponding uplink carrier of the PCell;
3>>> obtain the value for the corresponding $P_{CMAX,f,c}$ field from the physical layer;
3>>> instruct the Multiplexing and Assembly procedure to generate and transmit the Single Entry PHR MAC CE based on the values reported by the physical layer.
2>> start or restart phr-PeriodicTimer;
2>> start or restart phr-ProhibitTimer;
2>> cancel all triggered PHR(s).

If a UE determines that a Type 1 power headroom report for an activated serving cell is based on an actual PUSCH transmission then, for PUSCH transmission occasion i on active UL BWP b of carrier f of serving cell c, the UE may compute the Type 1 power headroom report (in dB) based on the following equation:

$$PH_{type1,b,f,c}(i,j,q_d,l) = P_{CMAX,f,c}(i) - \{P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}$$ [Math. 1]

where $P_{CMAX,f,c}(i)$, $P_{O\_PUSCH,b,f,c}(j)$, $M^{PUSCH}_{RB,b,f,c}(i)$, $\alpha_{b,f,c}(j)$, $PL_{b,f,c}(q_d)$, $\Delta_{TF,b,f,c}(i)$ and $f_{b,f,c}(i, l)$ are defined in subclause 7.1.1 of 3GPP TS 38.213.

If the UE determines that a Type 1 power headroom report for an activated serving cell is based on a reference PUSCH transmission then, for PUSCH transmission occasion i on active UL BWP b of carrier f of serving cell c, the UE may compute the Type 1 power headroom report (in dB) based on the following equation:

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}$$ [Math. 2]

where $$\tilde{P}_{CMAX,f,c} \quad (i)$$

is computed assuming MPR=0 dB, A-MPR=0 dB, P-MPR=0 dB. T=0 dB. MPR, A-MPR, P-MPR and $T_C$ are defined in 3GPP TS 38.101-1 and 3GPP TS 38.101-2. The remaining parameters are defined in subclause 7.1.1 of 3GPP 38.213 where $P_{O\_PUSCH,b,f,c}(j)$ and $\alpha_{b,f,c}(j)$ are provided from a RRC parameter p0-PUSCH-AlphaSetId=0 for the UL BWP b of carrier f of serving cell c, $PL_{b,f,c}(q_d)$ is obtained using a RRC parameter PathlossReferenceRS-Id=0, and l=0.

If a UE determines that a Type 3 power headroom report for an activated serving cell is based on an actual SRS transmission then, for SRS transmission occasion i on active UL BWP b of carrier f of serving cell c and if the UE is not configured for PUSCH transmissions on carrier f of serving cell c, the UE computes a Type 3 power headroom report (in dB) based on the following equation:

$$PH_{type3,b,f,c}(i,q_s) = P_{CMAX,f,c}(i) - \{P_{O\_SRS,b,f,c}(q_s) + 10\log_{10}(2^{\mu} \cdot M_{SRS,b,f,c}(i)) + \alpha_{SRS,b,f,c}(q_s) \cdot PL_{b,f,c}(q_d) + h_{b,f,c}(i)\}$$ [Math. 3]

where $P_{CMAX,f,c}(i)$, $P_{O\_SRS,b,f,c}(q_s)$, $M_{SRS,b,f,c}(i)$, $\alpha_{SRS,b,f,c}(q_s)$, $PL_{b,f,c}(q_d)$ and $h_{b,f,c}(i)$ are defined in subclause 7.3.1 of 3GPP TS 38.213.

If the UE determines that a Type 3 power headroom report for an activated serving cell is based on a reference SRS transmission then, for SRS transmission occasion i on UL BWP b of carrier f of serving cell c, and if the UE is not configured for PUSCH transmissions on UL BWP b of carrier f of serving cell c, the UE computes a Type 3 power headroom report (in dB) based on the following equation:

$$PH_{type3,b,f,c}(i,q_s) = \tilde{P}_{CMAX,f,c}(i) - \{P_{O\_SRS,b,f,c}(q_s) + \alpha_{SRS,b,f,c}(q_s) \cdot PL_{b,f,c}(q_d) + h_{b,f,c}(i)\}$$ [Math. 1]

where $q_s$ is a SRS resource set corresponding to SRS-ResourceSetId=0 and $P_{O\_SRS,b,f,c}(q_s)$, $\alpha_{SRS,b,f,c}(q_s)$, $PL_{b,f,c}(q_d)$ and $h_{b,f,c}(i)$ are defined in in subclause 7.3.1 of 3GPP TS 38.213 with corresponding values obtained from SRS-ResourceSetId=0.

$$\tilde{P}_{CMAX,f,c} \quad (1)$$

is computed assuming MPR=0 dB, A-MPR=0 dB, P-MPR=0 dB and T=0 dB. MPR, A-MPR, P-MPR and $T_c$ are defined in 3GPP TS 38.101-1 and 3GPP TS 38.101-2.

The MAC entity shall multiplex MAC CEs and MAC SDUs in a MAC PDU according to the logical channel prioritization and the MAC PDU structure. A MAC PDU consists of one or more MAC subPDUs. Each MAC sub-PDU consists of one of the following: i) a MAC subheader only (including padding); ii) a MAC subheader and a MAC SDU; iii) a MAC subheader and a MAC CE; iv) a MAC subheader and padding. Each MAC subheader corresponds to either a MAC SDU, a MAC CE, or padding. A MAC subheader except for fixed sized MAC CE, padding, and a MAC SDU containing UL CCCH consists of the four header fields: Reserved bit (R) field, Format (F) field, Logical Channel ID (LCID) field and Length (L) field. A MAC subheader for fixed sized MAC CE, padding, and a MAC SDU containing UL CCCH consists of the two header fields: Reserved bit (R) field and logical channel ID (LCID) field. MAC CEs are placed together. DL MAC subPDU(s) with MAC CE(s) is placed before any MAC subPDU with MAC SDU and MAC subPDU with padding. UL MAC subPDU(s) with MAC CE(s) is placed after all the MAC subPDU(s) with MAC SDU and before the MAC subPDU with padding in the MAC PDU. The size of padding can be zero.

Figure 10:
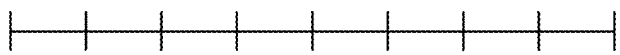

FIG. 8 to FIG. 10 illustrate examples of medium access control (MAC) control elements (CEs) for power headroom reporting according to some implementations of the present disclosure. In particular, FIG. 8 illustrates an example of a Single Entry PHR MAC CE, FIG. 9 illustrates an example of a Multiple Entry PHR MAC CE, and FIG. 10 illustrates another example of a Multiple Entry PHR MAC CE.

The Single Entry PHR MAC CE may be identified by a MAC PDU subheader with logical channel ID (LCID) defined for the Single Entry PHR. The following table shows an example of values of LCID for UL-SCH.

TABLE 10

| Index | LCID values |
| --- | --- |
| 0 | CCCH of size 64 bits |
| 1-32 | Identity of the logical channel |
| 33-51 | Reserved |
| 52 | CCCH of size 48 bits |

TABLE 10-continued

| Index | LCID values |
|---|---|
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

Referring to FIG. 8, the Single Entry PHR MAC CE may have a fixed size and consists of two octet as follows:

R: Reserved bit, set to "0";

Power Headroom (PH): This field indicates the power headroom level. The length of the field is 6 bits. The reported PH and the corresponding power headroom levels are shown in Table 11 below (the corresponding measured values in dB are shown in the last column of Table 11);

$P_{CMAX,f,c}$: This field indicates the $P_{CMAX,f,c}$ used for calculation of the preceding PH field. The reported $P_{CMAX,f,c}$ and the corresponding nominal UE transmit power levels are shown in Table 12 (the corresponding measured values in dBm are specified in the last column of Table 12).

Table 11 shows an example of power headroom levels for PHR, and Table 12 shows an example of nominal UE transmit power level for PHR.

TABLE 11

| PH | Power Headroom Level | Measured quantity value (dB) |
|---|---|---|
| 0 | POWER_HEADROOM_0 | PH < −32 |
| 1 | POWER_HEADROOM_1 | −32 ≤ PH < −31 |
| 2 | POWER_HEADROOM_2 | −31 ≤ PH < −30 |
| 3 | POWER_HEADROOM_3 | −30 ≤ PH < −29 |
| ... | ... | ... |
| 53 | POWER_HEADROOM_53 | 20 ≤ PH < 21 |
| 54 | POWER_HEADROOM_54 | 21 ≤ PH < 22 |
| 55 | POWER_HEADROOM_55 | 22 ≤ PH < 24 |
| 56 | POWER_HEADROOM_56 | 24 ≤ PH < 26 |
| 57 | POWER_HEADROOM_57 | 26 ≤ PH < 28 |
| 58 | POWER_HEADROOM_58 | 28 ≤ PH < 30 |
| 59 | POWER_HEADROOM_59 | 30 ≤ PH < 32 |
| 60 | POWER_HEADROOM_60 | 32 ≤ PH < 34 |
| 61 | POWER_HEADROOM_61 | 34 ≤ PH < 36 |
| 62 | POWER_HEADROOM_62 | 36 ≤ PH < 38 |
| 63 | POWER_HEADROOM_63 | PH ≥ 38 |

TABLE 12

| $P_{CMAX,f,c}$ | Nominal UE transmit power level | Measured quantity value (dBm) |
|---|---|---|
| 0 | PCMAX_C_00 | $P_{CMAX, c, f} < -29$ |
| 1 | PCMAX_C_01 | $-29 \leq P_{CMAX, c, f} < -28$ |
| 2 | PCMAX_C_02 | $-28 \leq P_{CMAX, c, f} < -27$ |
| ... | ... | ... |
| 61 | PCMAX_C_61 | $31 \leq P_{CMAX, c, f} < 32$ |
| 62 | PCMAX_C_62 | $32 \leq P_{CMAX, c, f} < 33$ |
| 63 | PCMAX_C_63 | $33 \leq P_{CMAX, c, f}$ |

FIG. 9 illustrates an example of Multiple Entry PHR MAC CE where the highest serving cell index (ServCellIndex) of Serving Cell with configured uplink is less than 8, and FIG. 10 illustrates an example of Multiple Entry PHR MAC CE where the highest ServCellIndex of Serving Cell with configured uplink is equal to or higher than 8. The Multiple Entry PHR MAC CE may be identified by a MAC PDU subheader with LCID defined for the Multiple Entry PHR (e.g., as specified in Table 10). It has a variable size, and includes the bitmap, a Type 2 PH field and an octet containing the associated $P_{CMAX,f,cfield}$ (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3.

The presence of Type 2 PH field for SpCell of the other MAC entity is configured by a RRC parameter phr-Type2OtherCell with value TRUE.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the downlink control information which has been received until and including the PDCCH occasion in which the first UL grant for a new transmission is received since a PHR has been triggered.

Referring to FIG. 9 and FIG. 10, the PHR MAC CEs are defined as follows:

$C_i$: This field indicates the presence of a PH field for the Serving Cell with ServCellIndex i. The C field set to "1" indicates that a PH field for the Serving Cell with ServCellIndex i is reported. The C field set to "0" indicates that a PH field for the Serving Cell with ServCellIndex i is not reported;

R: Reserved bit, set to "0";

V: This field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX,f,c}$ field, and V=1 indicates that the octet containing the associated $P_{CMAX,f,c}$ field is omitted;

Power Headroom (PH): This field indicates the power headroom level. The length of the field is 6 bits. The reported PH and the corresponding power headroom levels are shown in Table 11 (the corresponding measured values in dB for the NR Serving Cell are shown in the last column of Table 11 while the corresponding measured values in dB for the E-UTRA Serving Cell are specified in 3GPP TS 36.133);

P: This field indicates whether the MAC entity applies power backoff due to power management. The MAC entity shall set P=1 if the corresponding $P_{CMAX,f,c}$ field would have had a different value if no power backoff due to power management had been applied;

$P_{CMAX,f,c}$: If present, this field indicates the $P_{CMAX,f,c}$ or p used for calculation of the preceding PH field. The reported $P_{CMAX,f,c}$ and the corresponding nominal UE transmit power levels are shown in Table 12 (the corresponding measured values in dBm for the NR Serving Cell are shown in the last column of Table 12 while the corresponding measured values in dBm for the E-UTRA Serving Cell are specified in 3GPP TS 36.133).

In the examples shown in FIG. 8 to FIG. 10, a MAC entity of a UE (hereinafter, UE MAC entity) attaches 1 octet of Configured transmitted power (CTP) field for a Serving Cell (e.g., $P_{CMAX,f,c}$ field), after the octet containing a PH field of the Serving Cell in order to inform the network of configured transmitted power so that the network can calculate the remaining power headroom in the UE side.

As PHR is one of key scheduling assistance information, the network may want to receive it timely. Otherwise, the uplink transmission performance would decrease due to inaccurate power control. In the meanwhile, the network may not know whether the UE has triggered a PHR because the UE MAC entity triggers the PHR by considering the downlink path loss and/or power backoff in the UE side. Therefore, one safe way of receiving the PHR from the UE would be to give sufficient amount of UL grant to the UE. However, it would not be resource efficient to give sufficient amount of UL grant without knowing whether there is a triggered PHR or not, and also whether CTP field is to be reported or not.

Given the PHR format, e.g., Multiple Entry PHR MAC CE, the total size can be maximum 74 octets including the 2 bytes of MAC subheader, i.e., 4 bytes Ci field, 2 bytes for SpCell of other MAC entity, 2 bytes for PCell, and 64 bytes for other 31 Serving Cells. Among 74 octets, CTP field consumes 34 bytes for SpCell, PCell, and 31 other Serving Cells, which is almost half of total PHR MAC CE size. Since CTP field is present when there is a real transmission on PUSCH, PUCCH, or SRS for the activated serving cell, the overhead of CTP field increases as there is actual data transmission in uplink, which would not be desirable from resource efficiency perspective.

Figure 11:
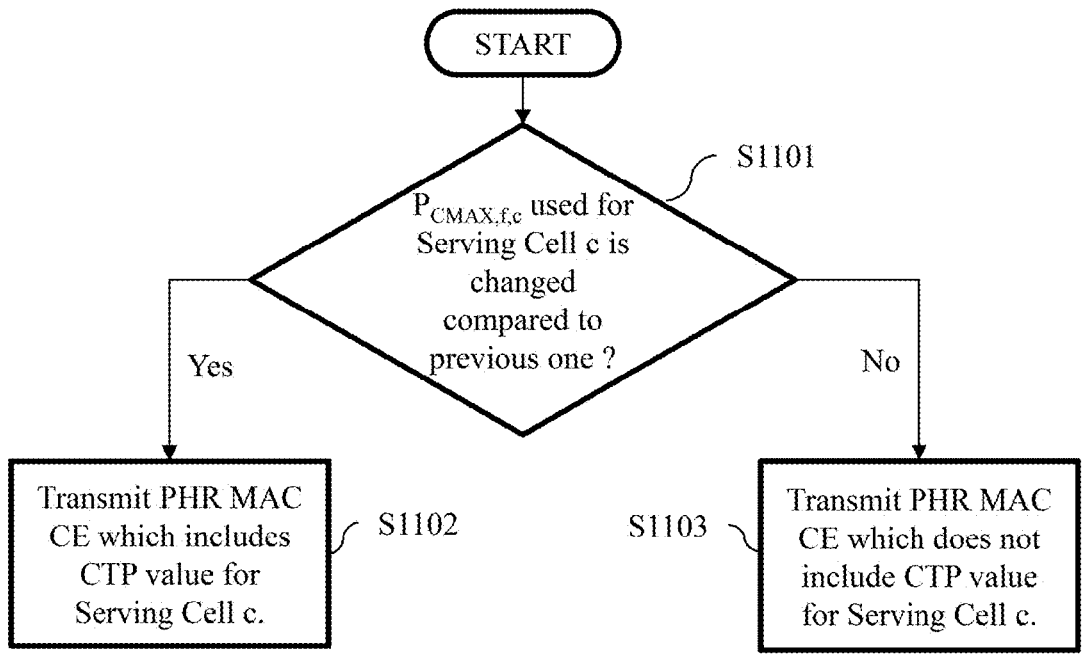
FIG. 11 illustrates an example of a power headroom reporting (PHR) procedure according to some implementations of the present disclosure.

FIG. 11 illustrates an example of a PHR procedure according to some implementations of the present disclosure.

In some implementations of the present disclosure, a UE (or a MAC entity for the UE) sends a PHR to a network by including a CTP field for a Serving Cell (S1102) if a CTP value for the Serving Cell is changed from the last one transmitted to the network via a PHR (S1101, Yes). In other words, the UE omits the CTP field for the Serving Cell in the PHR (S1103) if the CTP value for the Serving Cell remains unchanged as the last one transmitted to the network via a PHR (S1101, No). Accordingly, even if a PH value of the Serving Cell is calculated based on real transmission on PUSCH, PUCCH, or SRS, the UE determines further the presence of CTP field for the Serving Cell based on whether the CTP value for the Serving Cell is changed or not compared to a CTP value for the Serving Cell which is transmitted to the network via a previous PHR.

In the present disclosure, the UE refers to the UE itself or the MAC entity of the UE, In some implementations of the present disclosure, a CTP field refers to either $P_{CMAX,f,c}$ field in LTE (e.g., refer to 3GPP TS 36.321) or $P_{CMAX,f,c}$ field in NR. In some implementations of the present disclosure, when the UE omits a CTP field for a Serving Cell in a PHR, it may mean that the UE does not include an octet containing a CTP field for the Serving Cell.

In some implementations of the present disclosure, a UE receives information regarding a PHR operation. The information regarding the PHR operation includes parameters related to PHR timers such as phr-PeriodicTimer, phr-ProhibitTimer and/or PHR trigger such as phr-Tx-PowerFactorChange, and/or PHR format such as phr-Type2OtherCell, phr-ModeOtherCG, multiplePHR.

FIG. 12 to FIG. 17 illustrate examples of PHR MAC CE according to some implementations of the present disclosure.

Figure 12:
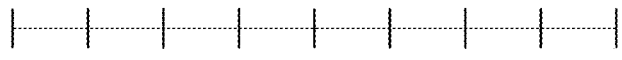
Figure 13:

FIG. 12 and FIG. 13 illustrate examples of Single Entry PHR MAC CE according to some other implementations of the present disclosure. In particular, FIG. 12 illustrates an example of Single Entry PHR MAC CE where a CTP field related to a PH field for a serving cell is present, and FIG. 13 illustrates an example of Single Entry PHR MAC CE where a CTP field related to a PH field for a serving cell is not present. The Single Entry PHR MAC CE has a fixed size and consists of one or two octets as follows.

i) R: Reserved bit, set to "0".

ii) X: This field indicates the presence of the octet containing the associated CTP field after the octet containing a PH field for a Serving Cell. The UE sets X=0 if the current CTP value for the corresponding Serving Cell is changed compared to a previously reported CTP value. The UE sets X=1 if the current CTP value for the corresponding Serving Cell is not changed compared to a previously reported CTP value.

> If the UE sets X=0, an octet containing a CTP field is present after the octet containing the PH field for the corresponding Serving Cell. If the UE sets X=1, an octet containing a CTP field is not present, i.e., omitted.

>> if the UE sets X indicating the presence of the octet containing the CTP field (i.e., X=0), the UE obtains $P_{CMAX,f,c}$ used for calculation of the preceding PH field, sets the CTP field according to the obtained $P_{CMAX,f,c}$, and includes an octet containing the CTP field right after the preceding octet containing the preceding PH field, as shown in FIG. 12.

>> if the UE sets X indicating the absence of the octet containing the CTP field (i.e., X=1), the UE does not $P_{CMAX,f,c}$ used for calculation of the preceding PH field, as shown in FIG. 13. The UE does not include an octet containing the CTP field but includes an octet containing a PH field for another Serving Cell right after the preceding octet containing the preceding PH field.

>> Note that X=0 indicates the presence of CTP field in Single Entry PHR MAC CE in order to allow common format of Single Entry PHR MAC CE for both of a UE supporting implementations of FIG. 11 and a UE not supporting implementations of FIG. 11, in case a CTP field is present. For Multiple Entry PHR MAC CE, X=0 indicates the absence of CTP field whereas X=1 indicates the presence of CTP field. Alternatively, if there is no problem foreseen in use of X=1 indicating the presence of CTP field in Single Entry PHR MAC CE, X=1 indicates the presence of CTP field while X=0 indicates the absence of CTP field.

> the previously reported CTP value refers to a CTP value which is reported for the Serving Cell through a PHR MAC CE which contains the CTP value for that Serving Cell. For example, if PHR MAC CE 1 transmitted at Time Point 1 reports CTP value 1 and PHR MAC CE 2 transmitted at Time Point 2, which occurs later than Time Point 1, reports no CTP value for the Serving Cell, where the previously reported CTP value is CTP value 1. In other words, the previously reported CTP value may mean a CTP value reported most recently.

> the UE determines that the current CTP value for the corresponding Serving Cell is changed compared to a previously reported CTP value in one of the following conditions:

>> if the current CTP value for the corresponding Serving Cell is not equal to a previously reported CTP value; or >> if the current CTP value for the corresponding Serving Cell is changed more than X compared to a previously reported CTP value, where X is configured to the UE by the network or specified in the 3GPP specification in units of dBm.

> the UE determines that the current CTP value for the corresponding Serving Cell is not changed compared to a previously reported CTP value in one of the following conditions:

>> if the current CTP value for the corresponding Serving Cell is equal to a previously reported CTP value; or >> if the current CTP value for the corresponding Serving Cell is changed equal to or less than Y compared to a previously reported CTP value, where Y is configured to the UE by the network or specified in the 3GPP specification in units of dBm.

iii) Power Headroom (PH): This field indicates the power headroom level. The length of the field is 6 bits. The reported PH and the corresponding power headroom levels are shown in Table 11 below (the corresponding measured values in dB are shown in the last column of Table 11);

iv) CTP: If present, this field indicates the $P_{CMAX,f,c}$ used for calculation of the preceding PH field. If not present, the previously reported $P_{CMAX,f,c}$ is used for calculation of the preceding PH field. The reported $P_{CMAX,f,c}$ and the corresponding nominal UE transmit power levels are shown in Table 12 (the corresponding measured values in dBm are specified in the last column of Table 12).

Figure 14:

FIG. 14 illustrates an example of Multiple Entry PHR MAC CE where the highest ServCellIndex of Serving Cell with configured uplink is less than 8 according to some implementations of the present disclosure, and FIG. 15 illustrates an example of Multiple Entry PHR MAC CE where the highest ServCellIndex of Serving Cell with configured uplink is equal to or higher than 8 according to some implementations of the present disclosure. FIG. 16 illustrates an example of Multiple Entry PHR MAC CE without CTP field, i.e., V=0 and X=0 according to some implementations of the present disclosure, and FIG. 17 illustrates an example of Multiple Entry PHR MAC CE with CTP field, i.e., V=0 and X=1 according to some implementations of the present disclosure.

The Multiple Entry PHR MAC CE has a variable size, and includes the bitmap, a Type 2 PH field and an octet containing the associated CTP field (if reported) for SpCell of the other MAC entity, a Type 1 PH field and an octet containing the associated CTP field (if reported) for the PCell. It further includes, in ascending order based on the ServCellIndex, one or multiple of Type X PH fields and octets containing the associated CTP fields (if reported) for Serving Cells other than PCell indicated in the bitmap, where X is either 1 or 3. Referring to FIG. 14 to FIG. 17, in some implementations of the present disclosure, each field of Multiple Entry PHR MAC CE may be defined as follows.

i) C This field indicates the presence of a PH field for the Serving Cell with ServCellIndex i. The C field set to "1" represents that a PH field for the Serving Cell with ServCellIndex i is reported. The C field set to "0" represents that a PH field for the Serving Cell with ServCellIndex i is not reported.

ii) R: Reserved bit, set to "0".

iii) V: This field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. For Type 1, Type 2, and Type 3, if V=0, the presence of the octet containing the associated CTP field is indicated by preceding X field, and if V=1, the octet containing the associated CTP field is omitted.

iv) X: This field indicates the presence of the octet containing the associated CTP field after the octet containing a PH field for a Serving Cell. The UE sets X=1 if a PH value in the associated PH field is based on real transmission on PUSCH for the corresponding Serving Cell (i.e., preceding V field is set to 0) and if the current CTP value for the corresponding Serving Cell is changed compared to a previously reported CTP value. The UE sets X=0 either if the PH value in the associated PH field is based PUSCH reference format (i.e., preceding V field is set to 1) or if the current CTP value for the corresponding Serving Cell is not changed compared to a previously reported CTP value although the PH value in the associated PH field is based on real transmission (i.e., preceding V field is set to 0).

> if the UE sets X indicating the presence of the octet containing the CTP field (i.e., X=1), the UE obtains $P_{CMAX,f,c}$ used for calculation of the preceding PH field, sets the CTP field according to the obtained $P_{CMAX,f,c}$, and includes an octet containing the CTP field right after the preceding octet containing the preceding PH field.

> if the UE sets X indicating the absence of the octet containing the CTP field (i.e., X=0), the UE does not $P_{CMAX,f,c}$ used for calculation of the preceding PH field even if the PH value is calculated based on real transmission, i.e., V=0. The UE does not include an octet containing the CTP field but includes an octet containing a PH field for another Serving Cell right after the preceding octet containing the preceding PH field.

> the previously reported CTP value refers to a CTP value which is reported for the Serving Cell through a PHR MAC CE which contains the CTP value for that Serving Cell. In other words, the previously reported CTP value may mean a CTP value reported most recently. For example, if PHR MAC CE 1 transmitted at Time Point 1 reports CTP value 1 and PHR MAC CE 2 transmitted at Time Point 2, which occurs later than Time Point 1, reports no CTP value for the Serving Cell, where the previously reported CTP value is CTP value 1.

> the UE determines that the current CTP value for the corresponding Serving Cell is changed compared to a previously reported CTP value in one of the following conditions:

>> if the current CTP value for the corresponding Serving Cell is not equal to a previously reported CTP value; or >> if the current CTP value for the corresponding Serving Cell is changed more than Y compared to a previously reported CTP value, where Y is configured to the UE by the network or specified in the 3GPP specification in units of dBm.

> the UE determines that the current CTP value for the corresponding Serving Cell is not changed compared to a previously reported CTP value in one of the following conditions:

>> if the current CTP value for the corresponding Serving Cell is equal to a previously reported CTP value; or >> if the current CTP value for the corresponding Serving Cell is changed equal to or less than X compared to a previously reported CTP value, where X is configured by the network or specified in the 3GPP specification in units of dBm.

v) Power Headroom (PH): This field indicates the power headroom level. The length of the field is 6 bits. The reported PH and the corresponding power headroom levels are shown in Table 11 (the corresponding measured values in dB for the NR Serving Cell are shown in the last column of Table 11 while the corresponding measured values in dB for the E-UTRA Serving Cell are specified in 3GPP TS 36.133);

vi) P: This field indicates whether the MAC entity applies power backoff due to power management. The MAC entity shall set P=1 if the corresponding CTP field would have had a different value if no power backoff due to power management had been applied;

vii) CTP: If present, this field indicates the $P_{CMAX,f,c}$ or $\tilde{P}_{CMAX,f,c}$ used for calculation of the preceding PH field. If not present, the previously reported $P_{CMAX,f,c}$ or $\tilde{P}_{CMAX,f,c}$ is used for calculation of the preceding PH field in case the PH value for an activated Serving Cell is based on real transmission, i.e., V=0. The reported $P_{CMAX,f,c}$ and the corresponding nominal UE transmit power levels are shown in Table 12 (the corresponding measured values in dBm for the NR Serving Cell are shown in the last column of Table 12 while the corresponding measured values in dBm for the E-UTRA Serving Cell are specified in 3GPP TS 36.133).

The UE triggers a PHR based on the PHR trigger condition (e.g. triggers a PHR if any one of events described before occur). While the UE has triggered at least one PHR and not cancelled the at least one PHR, if the UE has an UL resources allocated for a new transmission and the allocated UL resources can accommodate the PHR MAC CE plus its MAC subheader, the UE generates a PHR MAC CE by using a PHR MAC CE format according to some implementations of the present disclosure. The UE generates a MAC PDU including the PHR MAC CE and sends the MAC PDU including the PHR MAC CE by using the UL resources.

Figure 18:
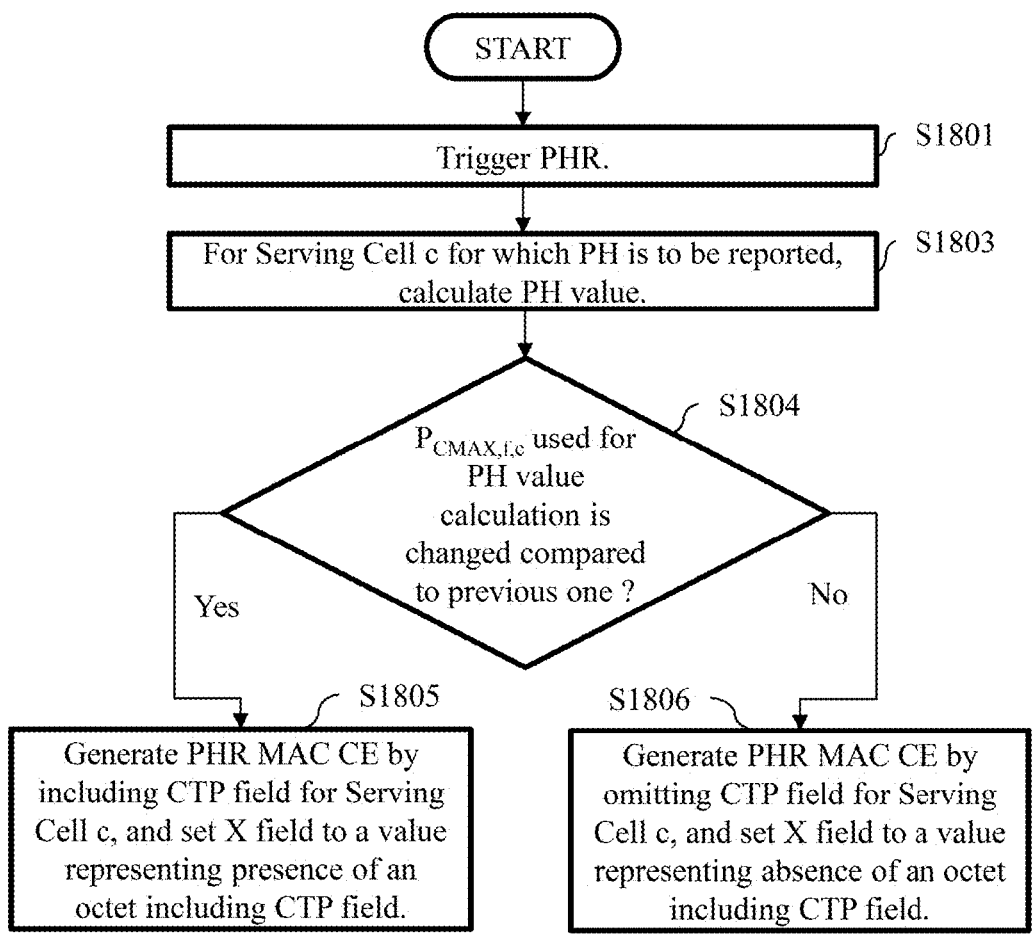
FIG. 18 illustrates an example of a PHR procedure according to some implementations of the present disclosure, where a PH value for Single PHR MAC CE is generated.

FIG. 18 illustrates an example of a PHR procedure according to some implementations of the present disclosure, where a PH value for Single PHR MAC CE is generated.

Referring to FIG. 18, a UE has triggered a PHR and not cancelled (S1801). The UE has UL resources that can be used for transmission of a Single Entry PHR MAC CE. For a Serving Cell c for which a PH is to be reported, the UE calculates a PH value for Single Entry PHR MAC CE. The UE determines whether $P_{CMAX,f,c}$ used for calculation of the PH value for the Serving Cell c is changed from the previously reported $P_{CMAX,f,c}$ for the Serving Cell c (S1804). The UE generates the Single Entry PHR MAC CE by including the CTP field for the Serving Cell c and sets the X field to a value representing the presence of an octet including the CTP field (S1805) if $P_{CMAX,f,c}$ used for calculation of the PH value for the Serving Cell c is changed from the previously reported $P_{CMAX,f,c}$ for Serving Cell c (S1804, Yes). The UE generates the PHR MAC CE by omitting the CTP field for the Serving Cell and sets the X field to a value representing the absence of an octet including the CTP field (S1806) if $P_{CMAX,f,c}$ used for calculation of the PH value for the Serving Cell is not changed from the previously reported $P_{CMAX,f,c}$ for Serving Cell c (S1804, No).

Figure 19:
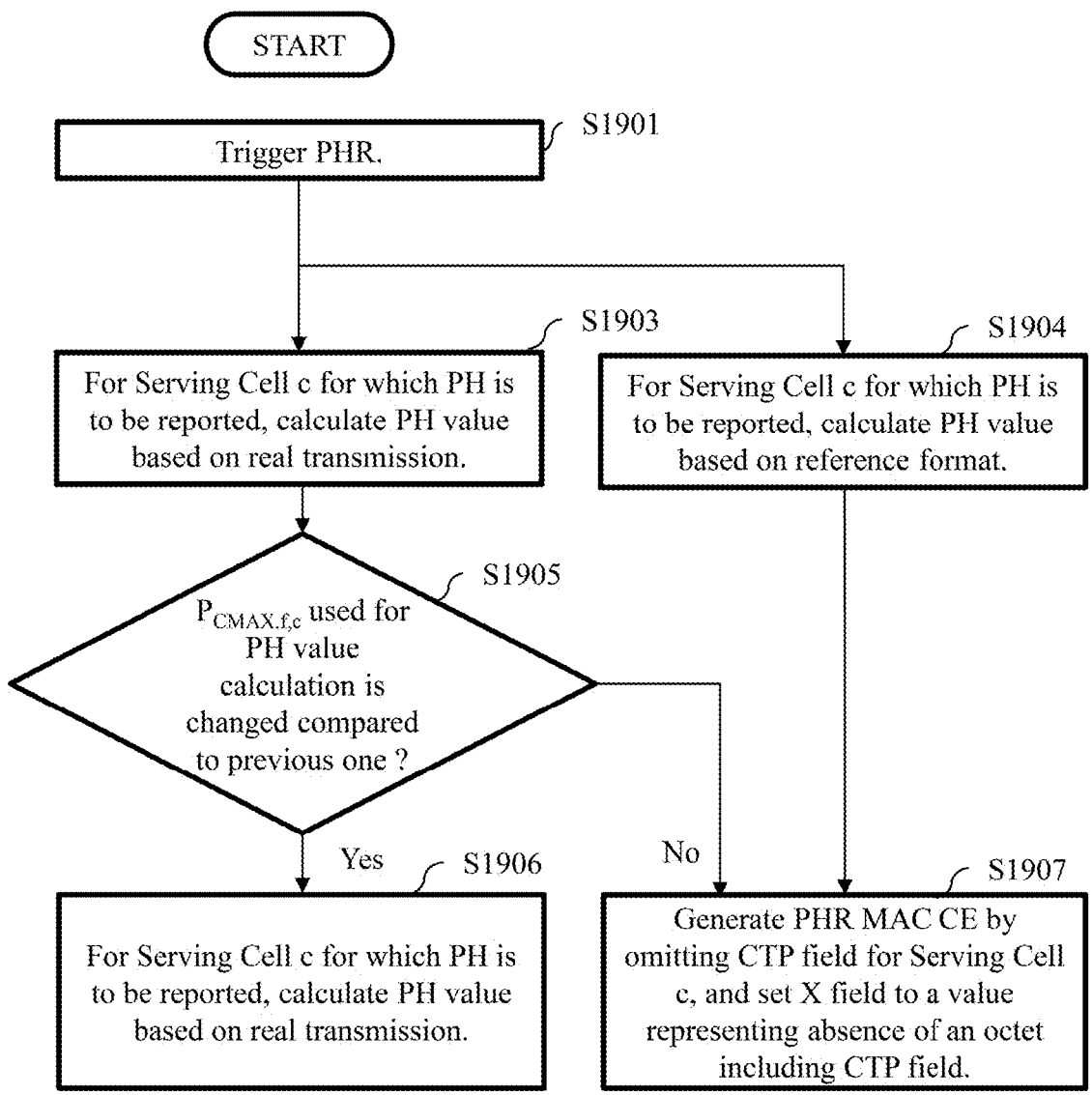
FIG. 19 illustrates an example of a PHR procedure, where a PH value is calculated based on real transmission or reference format for Multiple Entry PHR MAC CE.

FIG. 19 illustrates an example of a PHR procedure, where a PH value is calculated based on real transmission or reference format for Multiple Entry PHR MAC CE.

Referring to FIG. 19, a UE has triggered a PHR and not cancelled (S1901). The UE has UL resources that can be used for transmission of a Multiple Entry PHR MAC CE. For a Serving Cell c for which a PH is to be reported, the UE calculates a PH value for Multiple Entry PHR MAC CE based on real transmission (S1903) or based on a reference format (S1904) by considering the requirements related to Multiple Entry PHR MAC CE. If a PH value is calculated based on real transmission, the UE determines whether $P_{CMAX,f,c}$ used for calculation of the PH value for the Serving Cell c is changed from the previously reported $P_{CMAX,f,c}$ for Serving Cell (S1905). The UE generates the PHR MAC CE by including the CTP field for the Serving Cell and sets the X field to a value representing the presence of an octet including the CTP field (S1906) if $P_{CMAX,f,c}$ used for calculation of the PH value for the Serving Cell c is changed from the previously reported $P_{CMAX,f,c}$ for Serving Cell c (S1905, Yes). The UE generates the PHR MAC CE by omitting the CTP field for the Serving Cell and sets the X field to a value representing the absence of an octet including the CTP field (S1907) if $P_{CMAX,f,c}$ used for calculation of the PH value for the Serving Cell c is not changed from the previously reported $P_{CMAX,f,c}$ for Serving Cell c (S1905, No). If the PH value is calculated based on reference format (S1904), the UE generates the PHR MAC CE by omitting the CTP field for the Serving Cell c and sets the X field to a value representing the absence of an octet including the CTP field (S1907).

Figure 20:
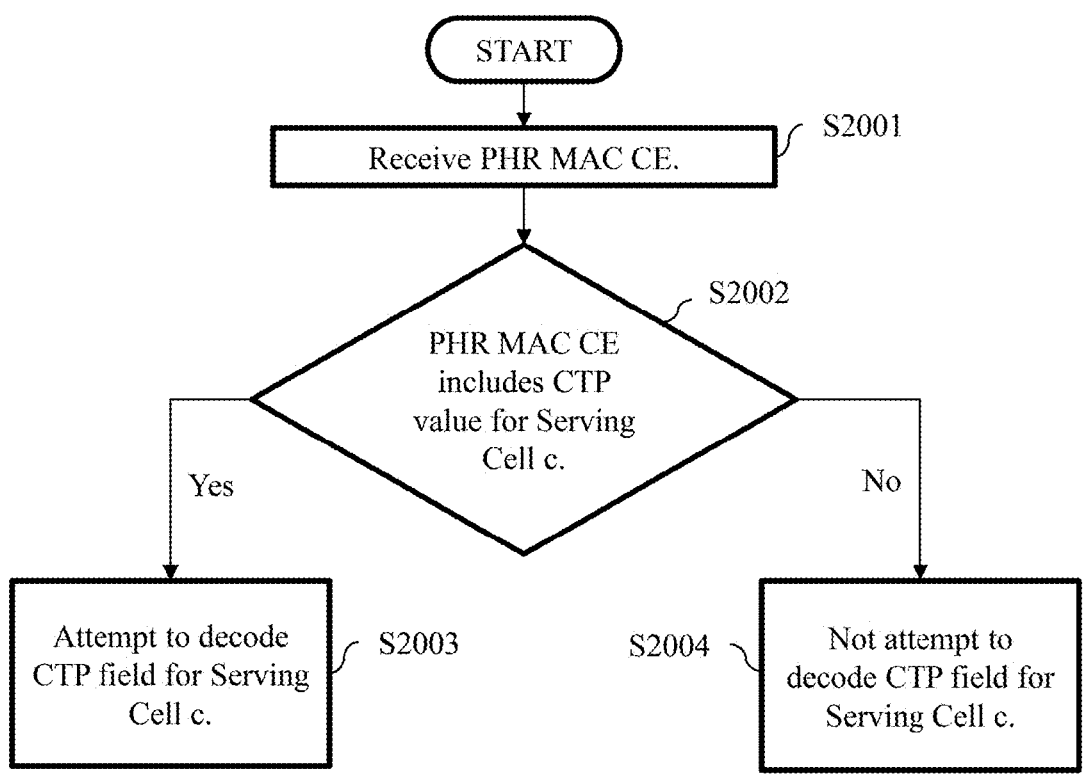
FIG. 20 illustrates an example of a PHR procedure at a network side according to some implementations of the present disclosure.

FIG. 20 illustrates an example of a PHR procedure at a network side according to some implementations of the present disclosure.

The network (e.g., BS) allocates UL resources to a UE. The network receives a MAC PDU including a PHR MAC CE from the UE (S2001). The network decodes the PHR MAC CE by considering the X field.

In some implementations of the present disclosure, for Single Entry MAC CE, the network may interpret the X field as follows.

- If X field is set to a value indicating the presence of an octet containing a CTP field (e.g., X=0) (S2002, Yes), the network decodes the CTP field (S2003) and considers the indicated $P_{CMAX,f,c}$ is used for calculation of the preceding PH value for the Serving Cell.
- If X field is set to a value indicating the absence of an octet containing a CTP field (e.g., X=1) (S2002, No), the network may not try to decode the CTP field (S2004) and considers the previously reported $P_{CMAX,f,c}$ is used for calculation of the preceding PH value for the Serving Cell.

In some implementations of the present disclosure, for Multiple Entry PHR MAC CE, the network may interpret the X field as follows. In this example, it is assumed that X=0 indicates the presence of a CTP field, and X=1 indicates the absence of a CTP field. However, in other scenarios, X=0 and X=1 may indicate the absence of a CTP field and the presence of a CTP field.

- If V is set to value indicating that PH value is calculated based on real transmission (e.g., V=0), and if X field is set to a value indicating the presence of an octet containing a CTP field (e.g., X=0) (S2002, Yes), the network decodes the CTP field (S2003) and considers the indicated $P_{CMAX,f,c}$ is used for calculation of the preceding PH value for the Serving Cell.
- If V is set to value indicating that PH value is calculated based on real transmission (e.g., V=0), and if X field is set to a value indicating the absence of an octet containing a CTP field (e.g., X=1) (S2002, No), the network may not try to decode the CTP field and considers the previously reported $P_{CMAX,f,c}$ is used for calculation of the preceding PH value for the Serving Cell.
- If V is set to value indicating that PH value is calculated based on reference format (e.g., V=1), the network may not try to decode the CTP field and considers the reference format is used for calculation of the preceding PH value for the Serving Cell.

Based on the reported PH value for each Serving Cell, the network performs power control for the UE.

Figure 21:
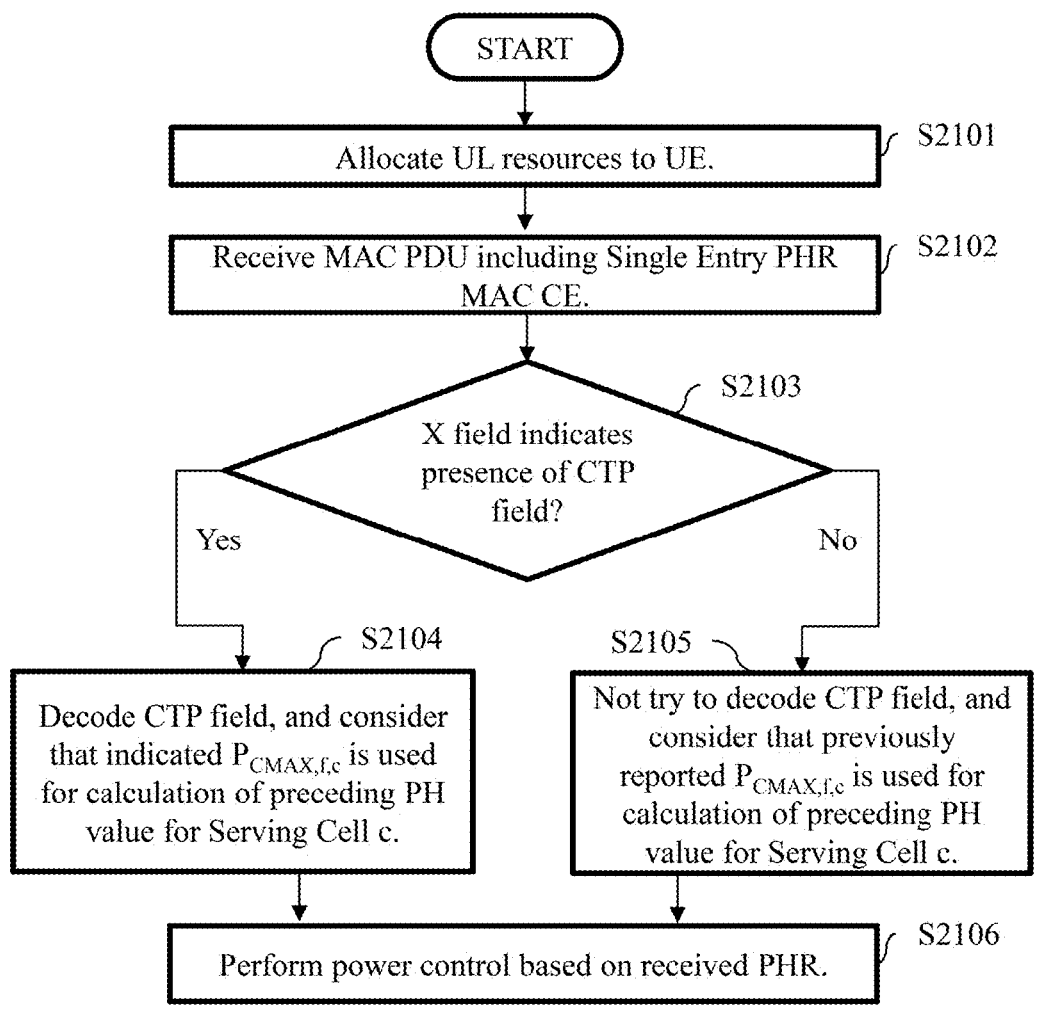
FIG. 21 illustrates another example of a PHR procedure at a network side according to some implementations of the present disclosure, where the network receives a Single Entry PHR MAC CE from a UE.

FIG. 21 illustrates another example of a PHR procedure at a network side according to some implementations of the present disclosure, where the network receives a Single Entry PHR MAC CE from a UE.

Referring to FIG. 21, the network allocates UL resources to a UE (S2101). The network receives a MAC PDU including a Single Entry PHR MAC CE on the allocated UL resources (S2102). The network may identify the Single Entry PHR MAC CE based on the LCID field of the corresponding MAC subheader. The network checks the X field in the Single Entry PHR MAC CE to determine whether the X field indicates the presence of CTP field or not (S2103). The network decodes the CTP field of a Serving Cell and considers that the indicated $P_{CMAX,f,c}$ is used for calculation of the preceding PH value for the Serving Cell c if the X field indicates the presence of CTP field (S2103, Yes). The network may not try to decode the CTP field and considers the previously reported $P_{CMAX,f,c}$ is used for calculation of the preceding PH value for the Serving Cell c (S2105), if the X field indicates the absence of CTP field (S2103, No). Based on the obtained $P_{CMAX,f,c}$ from the received PHR, the network may perform power control (S2106).

Figure 22:
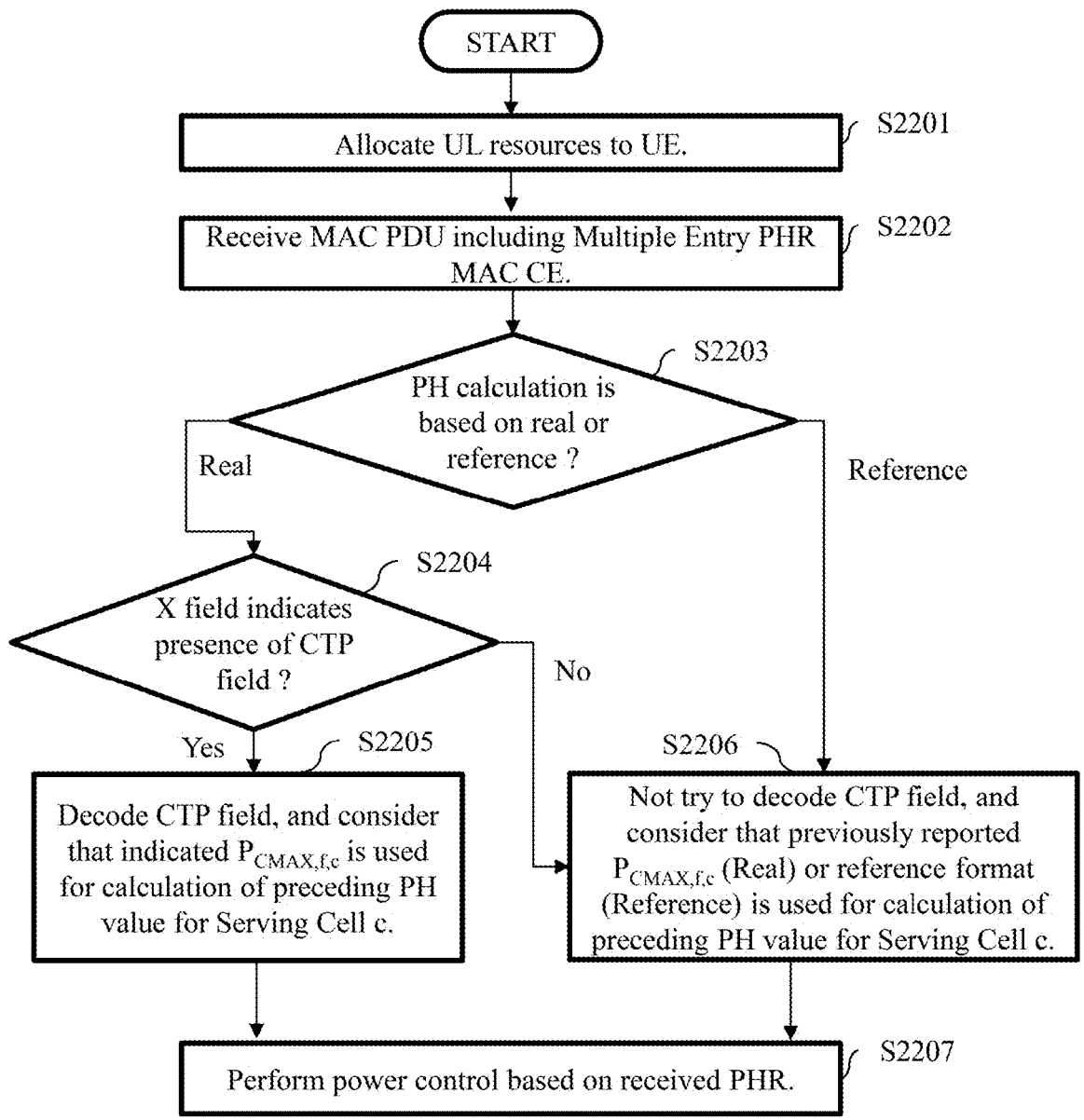
FIG. 22 illustrates another example of a PHR procedure at a network side according to some implementations of the present disclosure, where the network receives a Multiple Entry PHR MAC CE from a UE.

FIG. 22 illustrates another example of a PHR procedure at a network side according to some implementations of the present disclosure, where the network receives a Multiple Entry PHR MAC CE from a UE.

Referring to FIG. 22, the network allocates UL resources to a UE (S2201). The network receives a MAC PDU including a Multiple Entry PHR MAC CE on the allocated UL resources (S2202). The network may identify the Multiple Entry PHR MAC CE based on the LCID field of the corresponding MAC subheader. The network checks if the PH value is calculated based on real transmission (e.g., V field is set to 0), or reference format (e.g., V field is set to 1) (S2203). If V field represents that the PH value is calculated based on real transmission (S2203, Real), the network checks each X field in the Multiple Entry PHR MAC CE to determine whether the X field indicates the presence of CTP field or not (S2204). The network decodes the CTP field of Serving Cell c and considers that the indicated $P_{CMAX,f,c}$ is used for calculation of the preceding PH value for the Serving Cell c (S2205) if the X field related to the Serving Cell c represents the presence of CTP field (S2204, Yes). The network may not try to decode the CTP field and considers the previously reported $P_{CMAX,f,c}$ is used for calculation of the preceding PH value for the Serving Cell c (S2206) if the X field related to the Serving Cell c represents the absence of CTP field (S2204, No). If the V field represents that the PH value is calculated based on reference format (S2203, Reference), the network may not try to decode the CTP field and considers the reference format is used for calculation of the preceding PH value for the Serving Cell c (S2206). Based on the obtained $P_{CMAX,f,c}$ from the received PHR, the network may perform power control (S2207).

In some implementations of the present disclosure, a UE processor may generate a PHR MAC CE, e.g., Single Entry PHR MAC CE or Multiple Entry PHR MAC CE, by considering whether the CTP (e.g., $P_{CMAX,f,c}$) is changed from the previously reported one or not. For example, the UE processor may generate a PHR MAC CE including a CTP field related to a serving cell for which PH is reported if the CTP value for the serving cell is different from the previously reported one, or may generate a PHR MAC CE not including a CTP field related to the serving cell for which PH is reported if the CTP value for the serving cell is maintained compared to the previously reported one. The UE processor may generate the PHR MAC CE to include a value indicating the presence or absence of the CTP field for the serving cell. The UE processor may control a UE transceiver, to which the UE processor is operably connected, to transmit the PHR MAC CE. The UE processor may generate a MAC PDU including the PHR MAC CE, and transmit (or control the UE transceiver to transmit) the MAC PDU through a PUSCH based on a UL grant.

In some implementations of the present disclosure, the BS processor may monitor a PUSCH based on the UL grant allocated to the UE. The BS transceiver may receive radio signals including a PHR MAC CE via the PUSCH, and provide the PHR MAC CE to a BS processor operably connected to the BS transceiver. The BS processor receives the PHR MAC CE, and determines whether the PHR MAC CE includes a CTP field for a serving cell. The BS processor may determine a CTP value for the serving cell based on whether the PHR MAC CE includes a CTP field for the serving cell. The BS processor may perform power control based on the PHR for the serving cell.

For UL, the processor(s) 102 of the present disclosure may transmit (or control the transceiver(s) 106 to transmit) a PHR MAC CE based on the UL grant available to the UE. The processor(s) 202 of the present disclosure may receive (or control the transceiver(s) 206 to receive) the PHR MAC CE based on the UL grant available to the UE.

A PHR MAC CE according to some implementations of the present disclosure is subject to the physical layer processing at a transmitting side before transmission via radio interface, and the radio signals carrying the PHR MAC CE are subject to the physical layer processing at a receiving side. For example, a MAC PDU including the PHR MAC CE according to some implementations of the present disclosure may be subject to the physical layer processing.

Figure 23:
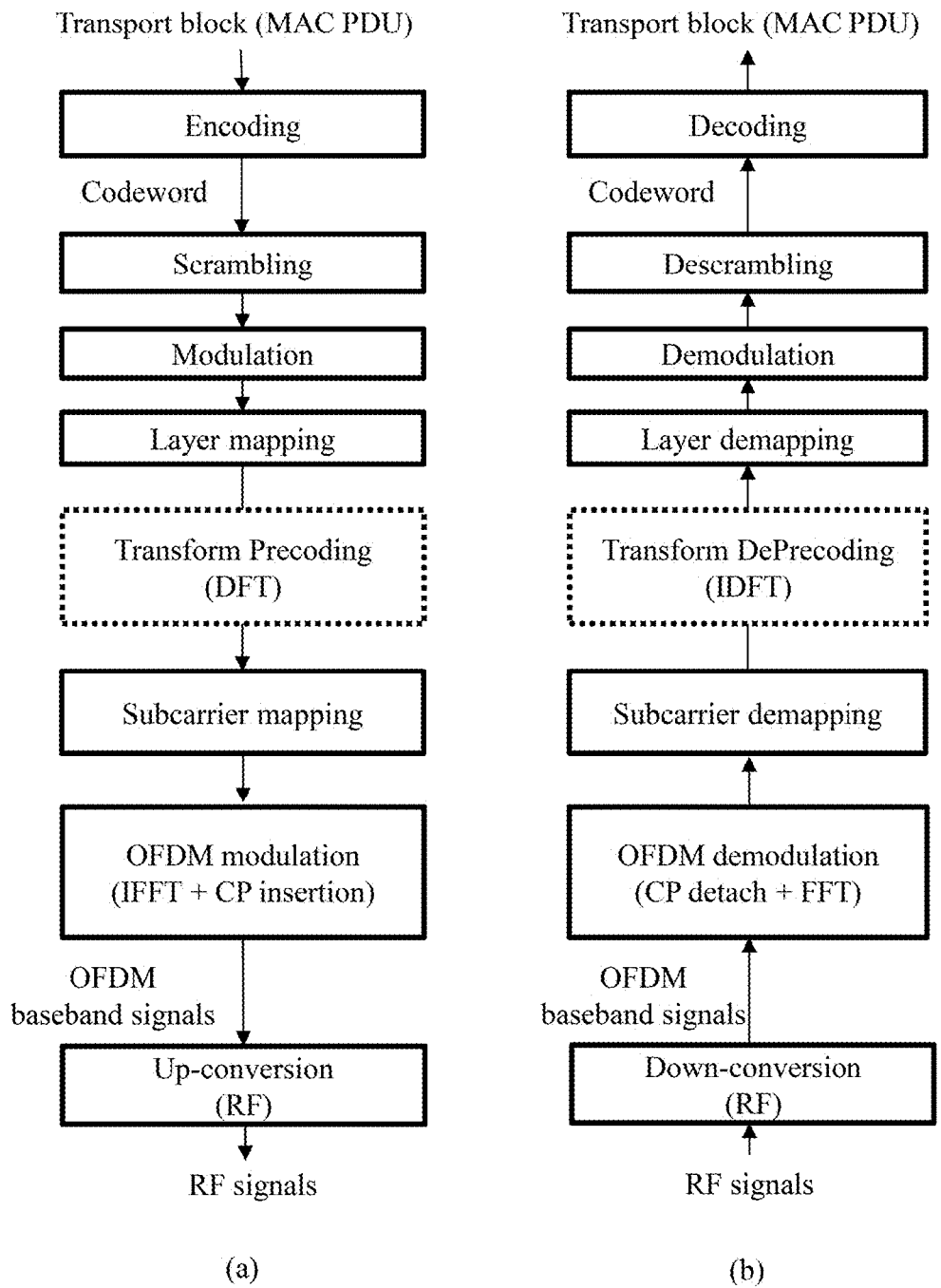
FIG. 23 illustrates an example of physical layer processing for some implementations of the present disclosure.

FIG. 23 illustrates an example of physical layer processing for some implementations of the present disclosure.

FIG. 23(a) illustrates an example of physical layer processing at a transmitting side.

The following tables show the mapping of the transport channels (TrCHs) and control information to its corresponding physical channels. In particular, Table 13 specifies the mapping of the uplink transport channels to their corresponding physical channels, Table 14 specifies the mapping of the uplink control channel information to its corresponding physical channel, Table 15 specifies the mapping of the downlink transport channels to their corresponding physical channels, and Table 16 specifies the mapping of the downlink control channel information to its corresponding physical channel.

TABLE 13

| TrCH | Physical Channel |
| --- | --- |
| UL-SCH | PUSCH |
| RACH | PRACH |

TABLE 14

| Control information | Physical Channel |
| --- | --- |
| UCI | PUCCH, PUSCH |

TABLE 15

| TrCH | Physical Channel |
| --- | --- |
| DL-SCH | PDSCH |
| BCH | PBCH |
| PCH | PDSCH |

TABLE 16

| Control information | Physical Channel |
| --- | --- |
| DCI | PDCCH |

Encoding

Data and control streams from/to MAC layer are encoded to offer transport and control services over the radio transmission link in the PHY layer. For example, a transport block from MAC layer is encoded into a codeword at a transmitting side. Channel coding scheme is a combination of error detection, error correcting, rate matching, interleaving and transport channel or control information mapping onto/splitting from physical channels.

In the 3GPP NR system, following channel coding schemes are used for the different types of TrCH and the different control information types.

TABLE 17

| TrCH | Coding scheme |
| --- | --- |
| UL-SCH | LDPC |
| DL-SCH | |
| PCH | |
| BCH | Polar code |

TABLE 18

| Control Information | Coding scheme |
| --- | --- |
| DCI | Polar code |
| UCI | Block code |
| | Polar code |

For transmission of a DL transport block (i.e. a DL MAC PDU) or a UL transport block (i.e. a UL MAC PDU), a transport block CRC sequence is attached to provide error detection for a receiving side. In the 3GPP NR system, the communication device uses low density parity check (LDPC) codes in encoding/decoding UL-SCH and DL-SCH. The 3GPP NR system supports two LDPC base graphs (i.e. two LDPC base matrixes): LDPC base graph 1 optimized for small transport blocks and LDPC base graph 2 for larger transport blocks. Either LDPC base graph 1 or 2 is selected based on the size of the transport block and coding rate R. The coding rate R is indicated by the modulation coding scheme (MCS) index $I_{MCS}$. The MCS index is dynamically provided to a UE by PDCCH scheduling PUSCH or PDSCH, provided to a UE by PDCCH activating or (re-)initializing the UL configured grant 2 or DL SPS, or provided to a UE by RRC signaling related to the UL configured grant Type 1. If the CRC attached transport block is larger than the maximum code block size for the selected LDPC base graph, the CRC attached transport block may be segmented into code blocks, and an additional CRC sequence is attached to each code block. The maximum code block sizes for the LDPC base graph 1 and the LDPC base graph 2 are 8448 bits and 3480 bits, respectively. If the CRC attached transport block is not larger than the maximum code block size for the selected LDPC base graph, the CRC attached transport block is encoded with the selected LDPC base graph. Each code block of the transport block is encoded with the selected LDPC base graph. The LDPC coded blocks are then individually rat matched. Code block concatenation is performed to create a codeword for transmission on PDSCH or PUSCH. For PDSCH, up to 2 codewords (i.e. up to 2 transport blocks) can be transmitted simultaneously on the PDSCH. PUSCH can be used for transmission of UL-SCH data and layer 1/2 control information. Although not shown in FIG. 23, the layer 1/2 control information may be multiplexed with the codeword for UL-SCH data.

Scrambling and Modulation

The bits of the codeword are scrambled and modulated to generate a block of complex-valued modulation symbols.

Layer Mapping

The complex-valued modulation symbols of the codeword are mapped to one or more multiple input multiple output (MIMO) layers. A codeword can be mapped to up to 4 layers. A PDSCH can carry two codewords, and thus a PDSCH can support up to 8-layer transmission. A PUSCH supports a single codeword, and thus a PUSCH can support up to 4-layer transmission.

Transform Precoding

The DL transmission waveform is conventional OFDM using a cyclic prefix (CP). For DL, transform precoding (in other words, discrete Fourier transform (DFT)) is not applied.

The UL transmission waveform is conventional OFDM using a CP with a transform precoding function performing DFT spreading that can be disabled or enabled. In the 3GPP NR system, for UL, the transform precoding can be optionally applied if enabled. The transform precoding is to spread UL data in a special way to reduce peak-to-average power ratio (PAPR) of the waveform. The transform precoding is a form of DFT. In other words, the 3GPP NR system supports two options for UL waveform: one is CP-OFDM (same as DL waveform) and the other one is DFT-s-OFDM.

Whether a UE has to use CP-OFDM or DFT-s-OFDM is configured by a BS via RRC parameters.

Subcarrier Mapping

The layers are mapped to antenna ports. In DL, for the layers to antenna ports mapping, a transparent manner (non-codebook based) mapping is supported and how beamforming or MIMO precoding is performed is transparent to the UE. In UL, for the layers to antenna ports mapping, both the non-codebook based mapping and a codebook based mapping are supported.

For each antenna port (i.e. layer) used for transmission of the physical channel (e.g. PDSCH, PUSCH), the complex-valued modulation symbols are mapped to subcarriers in resource blocks allocated to the physical channel.

OFDM Modulation

The communication device at the transmitting side generates a time-continuous OFDM baseband signal on antenna port p and subcarrier spacing configuration u for OFDM symbol l in a TTI for a physical channel by adding a cyclic prefix (CP) and performing IFFT. For example, for each OFDM symbol, the communication device at the transmitting side may perform inverse fast Fourier transform (IFFT) on the complex-valued modulation symbols mapped to resource blocks in the corresponding OFDM symbol and add a CP to the IFFT-ed signal to generate the OFDM baseband signal.

Up-Conversion

The communication device at the transmitting side up-convers the OFDM baseband signal for antenna port p, subcarrier spacing configuration u and OFDM symbol l to a carrier frequency $f_0$ of a cell to which the physical channel is assigned.

The processors 102 and 202 in FIG. 1B may be configured to perform encoding, scrambling, modulation, layer mapping, transform precoding (for UL), subcarrier mapping, and OFDM modulation. The processors 102 and 202 may control the transceivers 106 and 206 connected to the processors 102 and 202 to up-convert the OFDM baseband signal onto the carrier frequency to generate radio frequency (RF) signals. The radio frequency signals are transmitted through antennas 108 and 208 to an external device.

FIG. 23(b) illustrates an example of physical layer processing at a receiving side.

The physical layer processing at the receiving side is basically the inverse processing of the physical layer processing at the transmitting side.

Frequency Down-Conversion

The communication device at a receiving side receives RF signals at a carrier frequency through antennas. The transceivers 106 and 206 receiving the RF signals at the carrier frequency down-converts the carrier frequency of the RF signals into the baseband in order to obtain OFDM baseband signals.

OFDM Demodulation

The communication device at the receiving side obtains complex-valued modulation symbols via CP detachment and FFT. For example, for each OFDM symbol, the communication device at the receiving side removes a CP from the OFDM baseband signals and performs FFT on the CP-removed OFDM baseband signals to obtain complex-valued modulation symbols for antenna port p, subcarrier spacing u and OFDM symbol l.

Subcarrier Demapping

The subcarrier demapping is performed on the complex-valued modulation symbols to obtain complex-valued modulation symbols of a corresponding physical channel. For example, the processor(s) 102 may obtain complex-valued modulation symbols mapped to subcarriers belong to PDSCH from among complex-valued modulation symbols received in a bandwidth part. For another example, the processor(s) 202 may obtain complex-valued modulation symbols mapped to subcarriers belong to PUSCH from among complex-valued modulation symbols received in a bandwidth part.

Transform De-Precoding

Transform de-precoding (e.g. IDFT) is performed on the complex-valued modulation symbols of the uplink physical channel if the transform precoding has been enabled for the uplink physical channel. For the downlink physical channel and for the uplink physical channel for which the transform precoding has been disabled, the transform de-precoding is not performed.

Layer Demapping.

The complex-valued modulation symbols are de-mapped into one or two codewords.

Demodulation and Descrambling

The complex-valued modulation symbols of a codeword are demodulated and descrambled into bits of the codeword.

Decoding

The codeword is decoded into a transport block. For UL-SCH and DL-SCH, either LDPC base graph 1 or 2 is selected based on the size of the transport block and coding rate R. The codeword may include one or multiple coded blocks. Each coded block is decoded with the selected LDPC base graph into a CRC-attached code block or CRC-attached transport block. If code block segmentation was performed on a CRC-attached transport block at the transmitting side, a CRC sequence is removed from each of CRC-attached code blocks, whereby code blocks are obtained. The code blocks are concatenated into a CRC-attached transport block. The transport block CRC sequence is removed from the CRC-attached transport block, whereby the transport block is obtained. The transport block is delivered to the MAC layer.

In the above described physical layer processing at the transmitting and receiving sides, the time and frequency domain resources (e.g. OFDM symbol, subcarriers, carrier frequency) related to subcarrier mapping, OFDM modulation and frequency up/down conversion can be determined based on the resource allocation (e.g., UL grant, DL assignment).

For uplink data transmission, the processor(s) 102 of the present disclosure may apply (or control the transceiver(s) 106 to apply) the above described physical layer processing of the transmitting side to UL data/signal (e.g. PHR MAC CE) of the present disclosure to transmit the UL data/signal wirelessly. For uplink data reception, the processor(s) 102 of the present disclosure may apply (or control the transceiver(s) 106 to apply) the above described physical layer processing of the receiving side to received radio signals to obtain the UL data/signal of the present disclosure.

For downlink data transmission, the processor(s) 202 of the present disclosure may apply (or control the transceiver(s) 206 to apply) the above described physical layer processing of the transmitting side to DL data/signal of the present disclosure to transmit the DL data/signal wirelessly. For downlink data reception, the processor(s) 202 of the present disclosure may apply (or control the transceiver(s) 206 to apply) the above described physical layer processing of the receiving side to received radio signals to obtain DL data/signal of the present disclosure.

Given that the Multiple Entry PHR MAC CE can be up to 74 octets while a CTP field consumes 34 bytes, reducing a CTP field in the PHR MAC CE significantly reduces the overhead in PHR MAC CE. Given that PHR MAC CE is one key scheduling assistant information, it would be beneficial to transmit the PHR MAC CE more resource efficiently. In some implementations of the present disclosure (e.g. implementations related to FIG. 12 to FIG. 17), there is no loss of information what the PHR MAC CE carries compared to the PHR MAC CE in other implementations of the present disclosure (e.g. implementations related to FIG. 8 to FIG. 10). Some implementations of the present disclosure allow removal of redundant part in the PHR MAC CE so that the UE can transmit only the necessary information to the network. Moreover, supporting more cells and even fragmented bandwidth parts within a cell, there is a possibility that the PHR MAC CE size is increased more in the near future. In this case, having a way to reduce the total size of the PHR MAC CE would be helpful from system resource efficiency point of view.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for transmitting a power headroom report by a user equipment in a wireless communication system, the method comprising:
generating the power headroom report including a power headroom value for a serving cell determined based on a configured transmit power (CTP) value for the serving cell; and
transmitting the power headroom report to a network,
wherein, based on the CTP value for the serving cell not being equal to a last reported CTP value for the serving cell, the power headroom report includes a CTP field for the serving cell indicating the CTP value, and
wherein, based on the CTP value for the serving cell being equal to the last reported CTP value for the serving cell, the power headroom report does not include the CTP field for the serving cell.

2. The method according to claim 1,
wherein the power headroom report further includes i) first information regarding whether the CTP field for the serving cell exists after the power headroom value for the serving cell and ii) second information regarding whether the power headroom value for the serving cell in the power headroom report is based on a real uplink transmission or an uplink reference format.

3. The method according to claim 2,
wherein, based on the second information informing that the power headroom value for the serving cell in the power headroom report is based on the real uplink transmission, the first information is set to a first value or a second value depending on whether the power headroom report includes the CTP field for the serving cell.

4. The method according to claim 2,
wherein, based on the second information informing that the power headroom value for the serving cell in the power headroom report is based on the uplink reference format, the first information is set to a first value representing that the power headroom report does not include the CTP field for the serving cell.

5. A user equipment (UE) of transmitting a power headroom report in a wireless communication system, the UE comprising:
a transceiver;
at least one processor; and
at least one computer memory operably connectable to the at least one processor and storing instructions that, when executed, cause the at least one processor to perform operations comprising:
generating the power headroom report including a power headroom value for a serving cell determined based on a configured transmit power (CTP) value for the serving cell; and
transmitting the power headroom report to a network,
wherein, based on the CTP value for the serving cell not being equal to a last reported CTP value for the serving cell, the power headroom report includes a CTP field for the serving cell indicating the CTP value, and
wherein, based on the CTP value for the serving cell being equal to the last reported CTP value for the serving cell, the power headroom report does not include the CTP field for the serving cell.

6. The UE according to claim 5,
wherein the power headroom report further includes i) first information regarding whether the CTP field for the serving cell exists after the power headroom value for the serving cell, and ii) second information regarding whether the power headroom value for the serving cell in the power headroom report is based on a real uplink transmission or an uplink reference format.

7. The UE according to claim 6,
wherein, based on the second information informing that the power headroom value for the serving cell in the power headroom report is based on the real uplink transmission, the first information is set to a first value or a second value depending on whether the power headroom report includes the CTP field for the serving cell.

8. The UE according to claim 6,
wherein, based on the second information informing that the power headroom value for the serving cell in the power headroom report is based on the uplink reference format, the first information is set to a first value representing that the power headroom report does not include the CTP field for the serving cell.

9. A device for a user equipment, the device comprising:
at least one processor; and
at least one computer memory operably connectable to the at least one processor and storing instructions that, when executed, cause the at least one processor to perform operations comprising:
generating a power headroom report including a power headroom value for a serving cell determined based on a configured transmit power (CTP) value for the serving cell; and
transmitting the power headroom report to a network,
wherein, based on the CTP value for the serving cell not being equal to a last reported CTP value for the serving cell, the power headroom report includes a CTP field for the serving cell indicating the CTP value, and
wherein, based on the CTP value for the serving cell being equal to the last reported CTP value for the serving cell, the power headroom report does not include the CTP field for the serving cell.

10. The device according to claim 9,
wherein the power headroom report further includes i) first information regarding whether the CTP field for the serving cell exists after the power headroom value for the serving cell, and ii) second information regarding whether the power headroom value for the serving cell in the power headroom report is based on a real uplink transmission or an uplink reference format.

11. The device according to claim 10,
wherein, based on the second information informing that the power headroom value for the serving cell in the power headroom report is based on the real uplink transmission, the first information is set to a first value or a second value depending on whether the power headroom report includes the CTP field for the serving cell.

12. The device according to claim 10,
wherein, based on the second information informing that the power headroom value for the serving cell in the power headroom report is based on the uplink reference format, the first information is set to a first value representing that the power headroom report does not include the CTP field for the serving cell.

* * * * *